United States Patent
Shao-Horn et al.

(10) Patent No.: US 12,394,823 B2
(45) Date of Patent: Aug. 19, 2025

(54) POLYMER ELECTROLYTES FOR ELECTROCHEMICAL CELLS

(71) Applicant: Massachusetts Institute of Technology, Cambridge, MA (US)

(72) Inventors: Yang Shao-Horn, Newton, MA (US); Jeremiah A. Johnson, Boston, MA (US); Jeffrey Lopez, Cambridge, MA (US); Teruhiko Saito, Osaka (JP); Megan Hill, Cambridge, MA (US); Sipei Li, East Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 692 days.

(21) Appl. No.: 17/675,839

(22) Filed: Feb. 18, 2022

(65) Prior Publication Data

US 2022/0271337 A1 Aug. 25, 2022

Related U.S. Application Data

(60) Provisional application No. 63/151,167, filed on Feb. 19, 2021.

(51) Int. Cl.
*H01M 10/0565* (2010.01)

(52) U.S. Cl.
CPC ............. *H01M 10/0565* (2013.01); *H01M 2300/0082* (2013.01)

(58) Field of Classification Search
CPC .................................................. H01M 10/0565
See application file for complete search history.

(56) References Cited

U.S. PATENT DOCUMENTS 10,079,404 B1 9/2018 Burdynska et al.
10,116,001 B2 10/2018 Chen et al.

FOREIGN PATENT DOCUMENTS

CN 109638344 A * 4/2019 .......... H01M 10/054

OTHER PUBLICATIONS

Liang et al., Synthesis and self-assembly of a novel amphiphilic diblock copolymer consisting of isotactic polystyrene and 1,4-trans-polybutadiene-graft-poly(ethylene oxide). RSC Adv. Apr. 3, 2018;8:12752-9. doi: 10.1039/C8RA01288A.
Bachman et al., Inorganic Solid-State Electrolytes for Lithium Batteries: Mechanisms and Properties Governing Ion Conduction. Chem Rev. Jan. 13, 2016;116(1): 140-62. doi: 10.1021/acs.chemrev. 5b00563. Epub Dec. 29, 2015.
Brown et al., Hydroboration. 67. Cyclic hydroboration of acyclic α,ω-dienes with 9-borabicyclo[3.3.1]nonane/borane-dimethyl sulfide. J Org Chem. Mar. 1984;49(6):1072-8. doi: 10.1021/jo00180a023.

(Continued)

*Primary Examiner* — Karie O'Neill Apicella
(74) *Attorney, Agent, or Firm* — Wolf, Greenfield & Sacks, P.C.

(57) ABSTRACT

The present disclosure provides solid-state electrolytes based on a borylated-polymers (e.g., borylated-polybutadiene). Further provided are kits comprising, methods of synthesizing, and methods of using the solid-state electrolytes. In some aspects, the solid-state electrolytes demonstrate high ion conductivity at room temperature.

31 Claims, 15 Drawing Sheets

(56) References Cited

OTHER PUBLICATIONS

Chen et al., Cationic Covalent Organic Framework Nanosheets for Fast Li-Ion Conduction. J Am Chem Soc. Jan. 24, 2018;140(3):896-899. doi: 10.1021/jacs.7b12292. Epub Jan. 10, 2018.
Dhillon, R.S., Hydroboration Kinetics of Alkenes. In: Hydroboration and Organic Synthesis: 9-Borabicyclo [3.3.1] nonane (9-BBN). Springer Berlin, Heidelberg. 2007. p. 21. doi: 10.1007/978-3-540-49076-0.
Forsyth et al., Innovative Electrolytes Based on Ionic Liquids and Polymers for Next-Generation Solid-State Batteries. Acc Chem Res. Mar. 19, 2019;52(3):686-694. doi: 10.1021/acs.accounts.8b00566. Epub Feb. 25, 2019.
Guo et al., Fast Ion Transport Pathway Provided by Polyethylene Glycol Confined in Covalent Organic Frameworks. J Am Chem Soc. Feb. 6, 2019;141(5):1923-1927. doi: 10.1021/jacs.8b13551. Epub Jan. 24, 2019.
Hu et al., Crystalline Lithium Imidazolate Covalent Organic Frameworks with High Li-Ion Conductivity. J Am Chem Soc. May 8, 2019;141(18):7518-7525. doi: 10.1021/jacs.9b02448. Epub Apr. 23, 2019.
Huang et al., Fabrication and properties of polybutadiene rubber-interpenetrating cross-linking poly(propylene carbonate) network as gel polymer electrolytes for lithium-ion battery. RSC Adv. Jun. 17, 2015;5:52978-84. doi: 10.1039/C5RA05276A.
Jeong et al., Solvent-Free, Single Lithium-Ion Conducting Covalent Organic Frameworks. J Am Chem Soc. Apr. 10, 2019;141(14):5880-5885. doi: 10.1021/jacs.9b00543. Epub Mar. 27, 2019.
Jing et al., Catalyst-Free Dynamic Networks for Recyclable, Self-Healing Solid Polymer Electrolytes. J Am Chem Soc. Dec. 4, 2019;141(48): 18932-18937. doi: 10.1021/jacs.9b09811. Epub Nov. 21, 2019.
Long et al., Polymer Electrolytes for Lithium Polymer Batteries. J Mater Chem. May 25, 2016;26:10038-69. doi: 10.1039/C6TA02621D.
Matsumi et al., Polymerized Ionic Liquids via Hydroboration Polymerization as Single Ion Conductive Polymer Electrolytes. Macromolecules. Sep. 2, 2006;39(20):6924-7. doi: 10.1021/ma060472j.
Mehta et al., The use of boroxine rings for the development of high performance polymer electrolytes. Electrochim Acta. Jan. 3, 1999;45(8-9):1175-80. doi: 10.1016/S0013-4686(99)00378-3.
Midland et al., Kinetics of reductions of substituted benzaldehydes with B-alkyl-9-borabicyclo[3.3.1 ]nonane (9-BBN). J Am Chem Soc. Jan. 1982;104(2):525-8. doi: 10.1021/ja00366a025.
Minoura et al., Hydroboration of diene polymers. J App Poly Sci. Sep. 1979;15(9):2219-36. doi: 10.1002/app.1971.070150914.
Mizumo et al., Simple introduction of anion trapping site to polymer electrolytes through dehydrocoupling or hydroboration reaction using 9-borabicyclo[3.3.1]nonane. Electrochim Acta. Jun. 30, 2005;50(19):3928-33. doi: 10.1016/j.electacta.2005.02.050.
Montoro et al., Ionic Conductivity and Potential Application for Fuel Cell of a Modified Imine-Based Covalent Organic Framework. J Am Chem Soc. Jul. 26, 2017;139(29):10079-10086. doi: 10.1021/jacs.7b05182. Epub Jul. 14, 2017.
Thangadurai et al., Garnet-type solid-state fast Li ion conductors for Li batteries: critical review. Chem Soc Rev. Jul. 7, 2014;43(13):4714-27. doi: 10.1039/c4cs00020j. Epub Mar. 31, 2014.
Vazquez-Molina et al., Mechanically Shaped Two-Dimensional Covalent Organic Frameworks Reveal Crystallographic Alignment and Fast Li-Ion Conductivity. J Am Chem Soc. Aug. 10, 2016;138(31):9767-70. doi: 10.1021/jacs.6b05568. Epub Jul. 28, 2016.
Xu et al., Ion Conduction in Polyelectrolyte Covalent Organic Frameworks. J Am Chem Soc. Jun. 20, 2018;140(24):7429-7432. doi: 10.1021/jacs.8b03814. Epub Jun. 6, 2018.
Xue et al., Poly(ethylene oxide)-Based Electrolytes for Lithium-Ion Batteries. J Mater Chem. Jul. 20, 2015;38:19218-53. doi: 10.1039/C5TA03471J.
Yamaguchi et al., Asymmetric Hydroboration of Diene Polymers. Polym J. Jan. 1972;3(1):12-20. doi: 10.1295/polymj.3.12.
Zhang et al., Single lithium-ion conducting solid polymer electrolytes: advances and perspectives. Chem Soc Rev. Feb. 6, 2017;46(3):797-815. doi: 10.1039/c6cs00491a.

* cited by examiner

POLYMER ELECTROLYTES FOR ELECTROCHEMICAL CELLS

RELATED APPLICATIONS

The present application claims priority under 35 U.S.C. § 119(e) to U.S. provisional application, U.S. Ser. No. 63/151,167, filed Feb. 19, 2021, which is incorporated herein by reference.

BACKGROUND OF THE INVENTION

Lithium-ion batteries (LIBs), widely used in energy conversion and storage devices, are the most promising power sources for applications such as portable electronics, electric vehicles, and large-capacity electrical energy storage systems. However, they possess safety issues such as flammability, toxicity or leakage due to the use of liquid electrolytes based on organic solvents. To overcome these safety concerns, all solid-state electrolytes have been intensively studied to substitute the conventional separator/liquid-based electrolyte system, including inorganic solid electrolytes[1], MOF/COF based electrolytes[2] and organic polymer electrolytes (solid-state polymer electrolytes).[3] Among the solid-state electrolytes, solid-state polymer electrolytes offer several advantages over inorganic solid electrolytes, such as enhanced resistance to variations in the volume of the electrodes during the charge/discharge process, improved safety features, excellent flexibility, and processability. However, solid-state polymer electrolytes usually show low conductivity and lithium transference number ($t_{Li+}$) (defined as a fraction of the total current carried in an electrolyte by a lithium ion). As a representative example, polyethylene oxide (PEO) is conventionally used as a polymer electrolyte, but Li cations in the PEO matrix are generally less mobile than their anionic counterpart as their motion is highly coupled with that of PEO segments. This is the reason that the conductivity drops down at lower temperature than its glass transition temperature ($T_g$) and $t_{Li+}$ (<0.2) remain low.[4] Single-ion conducting polymers, which immobilize anions onto a polymer backbone, have additionally been widely studied; however, their ionic conductivities has generally been lower than that of dual-ion conducting systems due to the decreased number of mobile carriers.[3b]

Aiming at improving the conductivity and $t_{Li+}$ of solid-state polymer electrolytes, an alternative method has recently been proposed in which Lewis acidic sites are incorporated into solid-state polymer electrolytes as anion receptors to enhance their ionic conductivity and/or $t_{Li+}$. In these systems, the interaction between the anions and the Lewis acidic site promotes the dissociation of lithium cation, which might lead to an increase in both ionic conductivity and $t_{Li+}$ at the same time. Mehta et al. reported the thermal treatment of boron oxide in the presence of polyether resulting in the formation of a polymer electrolyte network including boroxine rings,[5] and Ohno group demonstrate the introduction of 9-bora[3.1.1]bicyclononane (9-BBN) into PEO through the simple dehydrogenation.[6,7] They showed significant improvement of $t_{Li+}$ (0.6-0.8) compared with PEO but the conductivity was still similar with PEO due to the high contents of PEO in the polymers. Additionally, Ohno et al. found the $t_{Li+}$ for polymer bearing alkylborane unit was much higher than that bearing boronic ester unit, implying that high Lewis acidic group is better to obtain high $t_{Li+}$.[8]

SUMMARY OF THE INVENTION

To further seek new solid-state polymer electrolytes rather than PEO, disclosure herein are polyolefin-based solid-state polymer electrolytes prepared by the simple hydroboration of polybutadiene resulting in a saturated or unsaturated carbon backbone bearing boron-based groups in the side chain. In contrast with previous solid-state polymer electrolytes having boroxine or boronic ester, the newly designed polymers did not possess heteroatoms potentially coordinating Li cations. The polymer electrolytes demonstrated high $t_{Li+}$ along with good conductivity due to the high concentration of boron moiety on the polymer and the high free volume by rigidity of main chain. The mechanical properties are also higher than previous PEO based electrolytes.

Provided herein are solid-state polymer electrolytes and compositions thereof, as well as methods of preparing and using the same. The polymer electrolytes have high ion conductivity at a variety of temperatures. Further, the conductivity can be tuned based on the composition of the polymer. These solid-state electrolytes are appropriate for use in electrochemical cells.

In some aspects, the present disclosure provides a solid-state electrolyte comprising an ion and a polymer, wherein the polymer comprises alkylene and boronyl moieties. In certain aspects, the polymer further comprises alkenylene moieties. In some aspects, the polymer comprises terminal methyl groups, repeat unit Z:

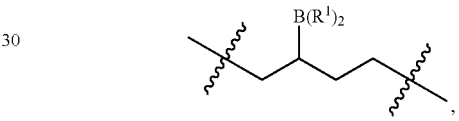

repeat unit X:

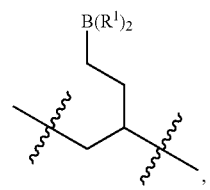

and repeat unit Y:

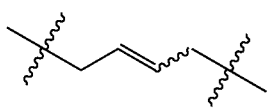

wherein $R^1$ is as defined herein. In certain aspects, the polymer comprises terminal methyl groups, repeat unit Z:

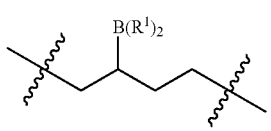

and repeat unit X:

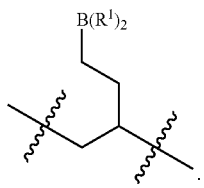

In some embodiments, the polymer comprises a ratio of 1:4:0 of X:Z:Y repeat units, a ratio of 4:11:5 of X:Z:Y repeat units, a ratio of 2:3:5 of X:Z:Y repeat units, or a ratio of 4:1:15 of X:Z:Y repeat units and has an $M_n$ of about 5000, a PDI of 1.03, and/or a $M_w$ of about 5150. In some embodiments, the ratio of anion to boron in the electrolyte is 0.5.

Further provided herein are methods of preparing a solid-state electrolyte comprising hydroborating polybutadiene with a borane or organoborane to yield a borylated-polybutadiene. In some aspects, the method further comprises casting the polymer and an ion to form a film and drying and annealing the film.

Also provided herein are solid-state electrolytes prepared by (i) hydroborating polybutadiene with a borane or organoborane to yield a borylated-polybutadiene, (ii) dissolving the borylated-polybutadiene and an ion in an organic solvent, and (iii) forming a polymer film. In some aspects, the polymer film is formed by casting the solvent mixture. The solid-state electrolytes may be prepared by including the additional steps of annealing the film, pressing the film, and drying the film.

In other aspects, disclosure herein are kits that are useful for preparing a solid-state electrolyte as described herein.

Additionally, some aspects of the disclosure are directed to an electrochemical cell comprising a solid-state electrolyte as described herein.

Further provided herein are methods of transporting ions comprising contacting a solid-state electrolyte as described herein with ions.

In certain aspects, the disclosure provides for the use of a solid-state electrolyte as described herein to transport ions.

Further provided herein are methods of conducting electrical charge comprising contacting a solid-state electrolyte as described herein with ions.

Also provided herein are uses of a solid-state electrolyte as described herein to conduct electrical charge.

The details of certain embodiments of the invention are set forth in the Detailed Description of Certain Embodiments, as described below. Other features, objects, and advantages of the invention will be apparent from the Definitions, Figures, Examples, and Claims.

DEFINITIONS

Figure 1:
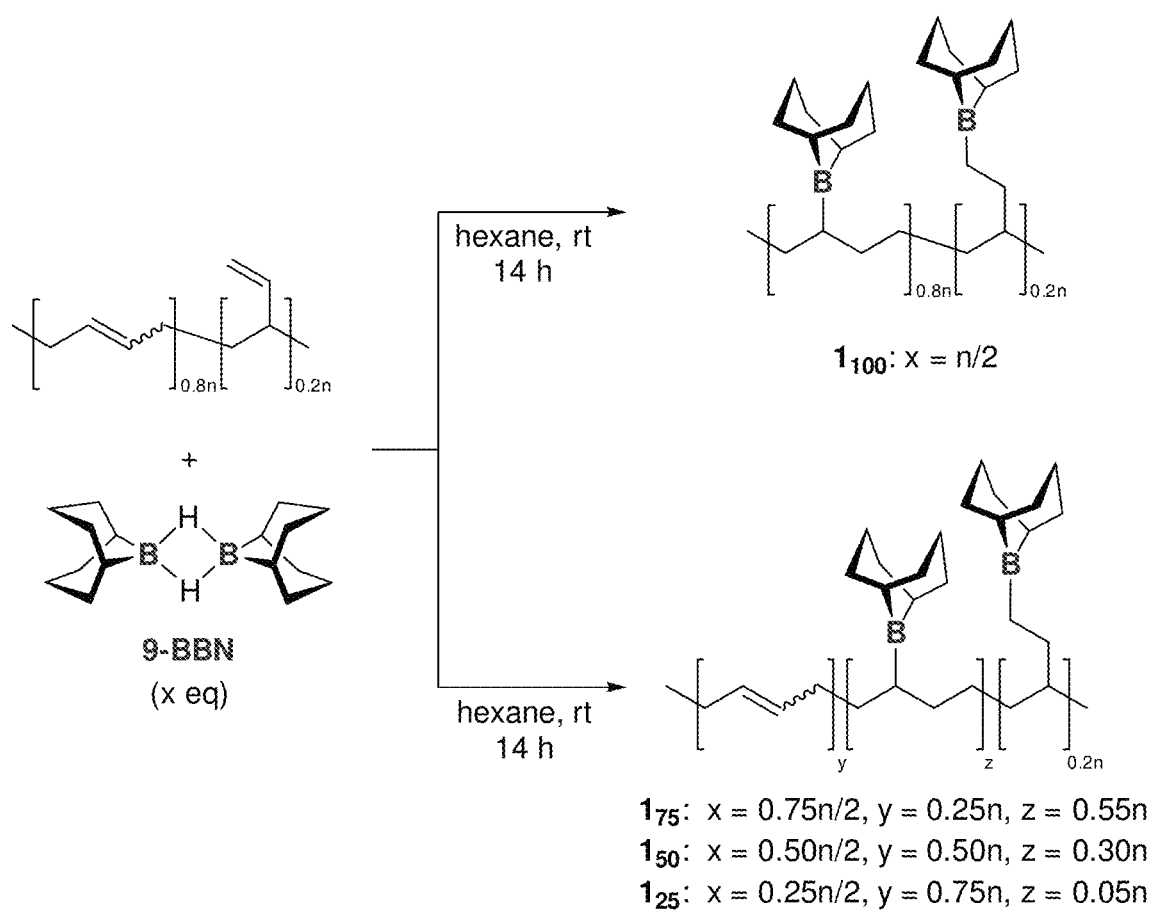
FIG. 1 shows an exemplary scheme of the hydroboration of polybutadiene and the resulting polymers. The brackets around repeat units X, Y, and Z indicate the ratios of the repeat units, not the actual number of repeat units. It should be understood that the connectivity of the repeat units is random, and a triblock copolymer is not formed.
Figure 2:
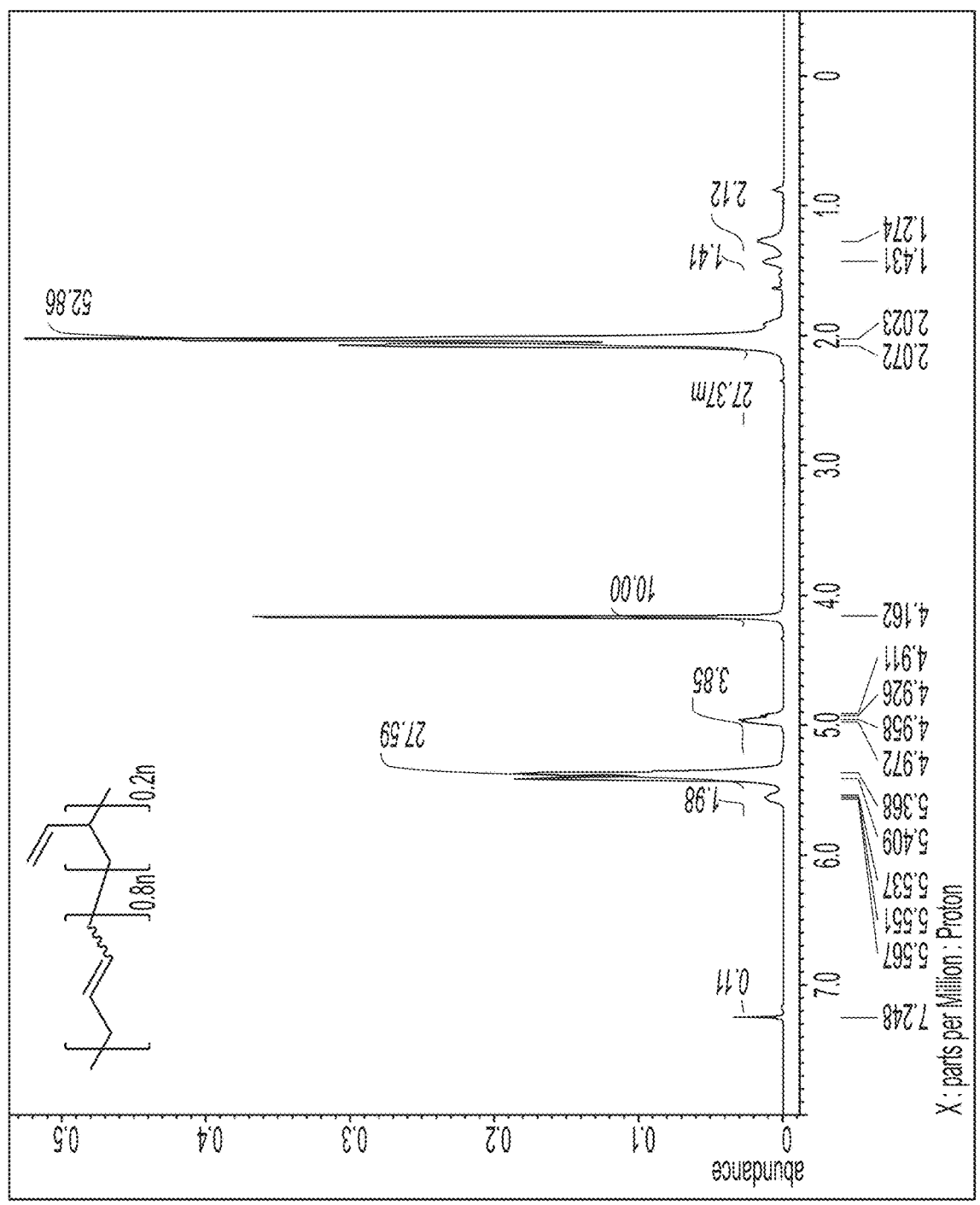
FIG. 2 shows the $^1$H NMR of polybutadiene before hydroboration.
Figure 3:
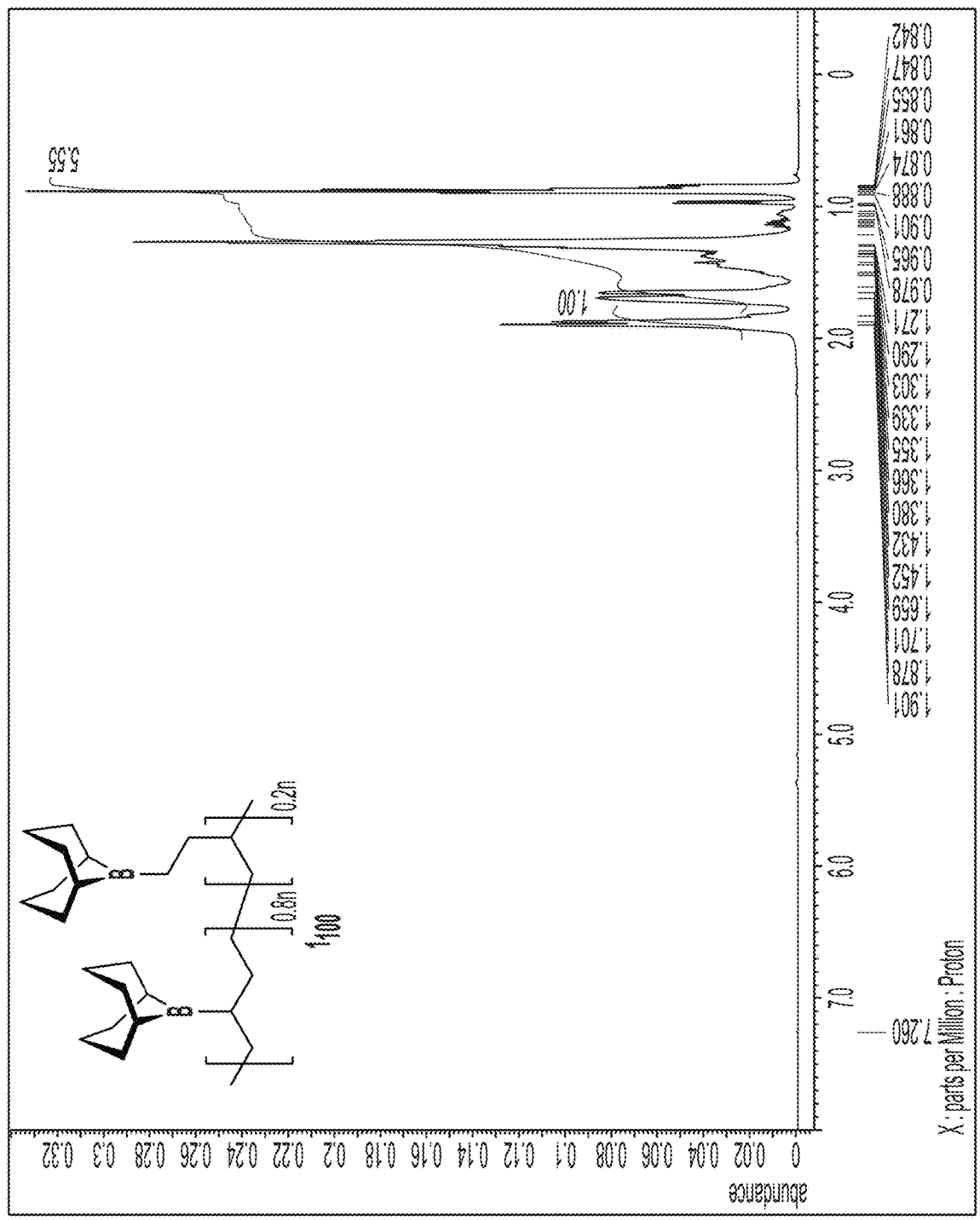
FIG. 3 shows the $^1$H NMR of the polymer of FIG. 2 after hydroboration.

For convenience, certain terms employed herein, in the specification, examples, and claims are collected herein.

Definitions of specific functional groups and chemical terms are described in more detail below. The chemical elements are identified in accordance with the Periodic Table of the Elements, CAS version, *Handbook of Chemistry and Physics*, 75$^h$ Ed., inside cover, and specific functional groups are generally defined as described therein. Additionally, general principles of organic chemistry, as well as specific functional moieties and reactivity, are described in Thomas Sorrell, *Organic Chemistry*, University Science Books, Sausalito, 1999; Michael B. Smith, *March's Advanced Organic Chemistry*, 7$^{th}$ Edition, John Wiley & Sons, Inc., New York, 2013; Richard C. Larock, *Comprehensive Organic Transformations*, John Wiley & Sons, Inc., New York, 2018; and Carruthers, *Some Modern Methods of Organic Synthesis*, 3$^{rd}$ Edition, Cambridge University Press, Cambridge, 1987.

Unless otherwise required by context, singular terms shall include pluralities, and plural terms shall include the singular.

The language "in some embodiments" and the language "in certain embodiments" are used interchangeably.

The following definitions are more general terms used throughout the present application:

The singular terms "a," "an," and "the" include plural references unless the context clearly indicates otherwise. Similarly, the word "or" is intended to include "and" unless the context clearly indicates otherwise.

Other than in the examples, or where otherwise indicated, all numbers expressing quantities of ingredients or reaction conditions used herein should be understood as modified in all instances by the term "about." "About" and "approximately" shall generally mean an acceptable degree of error for the quantity measured given the nature or precision of the measurements. Exemplary degrees of error are within 20 percent (%), typically, within 10%, or more typically, within 5%, 4%, 3%, 2%, or 1% of a given value or range of values.

As used herein, the term "salt" refers to any and all salts, and encompasses pharmaceutically acceptable salts.

Unless otherwise provided, a formula includes compounds that do not include isotopically enriched atoms and also compounds that include isotopically enriched atoms. Compounds that include isotopically enriched atoms may be useful, for example, as analytical tools and/or probes in biological assays.

When a range of values ("range") is listed, it is intended to encompass each value and sub-range within the range. A range is inclusive of the values at the two ends of the range unless otherwise provided. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" refers to a radical of a straight-chain or branched saturated hydrocarbon group having from 1 to 20 carbon atoms ("$C_{1-20}$ alkyl"). In some embodiments, an alkyl group has 1 to 12 carbon atoms ("$C_{1-12}$ alkyl"). In some embodiments, an alkyl group has 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, isobutyl), pentyl ($C_5$) (e.g., n-pentyl, 3-pentanyl, amyl, neopentyl, 3-methyl-2-butanyl, tert-amyl), and hexyl ($C_6$) (e.g., n-hexyl). Additional examples of alkyl groups include n-heptyl ($C_7$), n-octyl ($C_8$), n-dodecyl ($C_{12}$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-12}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu or s-Bu), unsubstituted isobutyl (i-Bu)). In certain embodiments, the alkyl group is a substituted $C_{1-12}$ alkyl (such as substituted $C_{1-6}$ alkyl, e.g., —$CH_2F$, —$CHF_2$, —$CF_3$, —$CH_2CH_2F$, —$CH_2CHF_2$, —$CH_2CF_3$, or benzyl (Bn)). e.g.

The term "alkenyl" refers to a radical of a straight-chain or branched hydrocarbon group having from 1 to 20 carbon atoms and one or more carbon-carbon double bonds (e.g., 1, 2, 3, or 4 double bonds). In some embodiments, an alkenyl group has 1 to 20 carbon atoms ("$C_{1-20}$ alkenyl"). In some embodiments, an alkenyl group has 1 to 12 carbon atoms ("$C_{1-12}$ alkenyl"). In some embodiments, an alkenyl group has 1 to 11 carbon atoms ("$C_{1-11}$ alkenyl"). In some embodiments, an alkenyl group has 1 to 10 carbon atoms ("$C_{1-10}$ alkenyl"). In some embodiments, an alkenyl group has 1 to 9 carbon atoms ("$C_{1-9}$ alkenyl"). In some embodiments, an alkenyl group has 1 to 8 carbon atoms ("$C_{1-8}$ alkenyl"). In some embodiments, an alkenyl group has 1 to 7 carbon atoms ("$C_{1-7}$ alkenyl"). In some embodiments, an alkenyl group has 1 to 6 carbon atoms ("$C_{1-6}$ alkenyl"). In some embodiments, an alkenyl group has 1 to 5 carbon atoms ("$C_{1-5}$ alkenyl"). In some embodiments, an alkenyl group has 1 to 4 carbon atoms ("$C_{1-4}$ alkenyl"). In some embodiments, an alkenyl group has 1 to 3 carbon atoms ("$C_{1-3}$ alkenyl"). In some embodiments, an alkenyl group has 1 to 2 carbon atoms ("$C_{1-2}$ alkenyl"). In some embodiments, an alkenyl group has 1 carbon atom ("$C_1$ alkenyl"). The one or more carbon-carbon double bonds can be internal (such as in 2-butenyl) or terminal (such as in 1-butenyl). Examples of $C_{1-4}$ alkenyl groups include methylindenyl ($C_1$), ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{1-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{1-20}$ alkenyl. In certain embodiments, the alkenyl group is a substituted $C_{1-20}$ alkenyl. In an alkenyl group, a C=C double bond for which the stereochemistry is not specified (e.g., —CH=$CHCH_3$ or

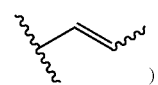
)

may be in the (E)- or (Z)-configuration.

The term "heteroalkyl" refers to an alkyl group, which further includes at least one heteroatom (e.g., 1, 2, 3, or 4 heteroatoms) selected from oxygen, nitrogen, or sulfur within (e.g., inserted between adjacent carbon atoms of) and/or placed at one or more terminal position(s) of the parent chain. In certain embodiments, a heteroalkyl group refers to a saturated group having from 1 to 20 carbon atoms and 1 or more heteroatoms within the parent chain ("heteroC$_{1-20}$alkyl"). In certain embodiments, a heteroalkyl group refers to a saturated group having from 1 to 12 carbon atoms and 1 or more heteroatoms within the parent chain ("heteroC$_{1-12}$ alkyl"). In some embodiments, a heteroalkyl group is a saturated group having 1 to 11 carbon atoms and 1 or more heteroatoms within the parent chain ("heteroC$_{1-11}$ alkyl"). In some embodiments, a heteroalkyl group is a saturated group having 1 to 10 carbon atoms and 1 or more heteroatoms within the parent chain ("heteroC$_{1-10}$ alkyl"). In some embodiments, a heteroalkyl group is a saturated group having 1 to 9 carbon atoms and 1 or more heteroatoms within the parent chain ("heteroC$_{1-9}$ alkyl"). In some embodiments, a heteroalkyl group is a saturated group having 1 to 8 carbon atoms and 1 or more heteroatoms within the parent chain ("heteroC$_{1-8}$alkyl"). In some embodiments, a heteroalkyl group is a saturated group having 1 to 7 carbon atoms and 1 or more heteroatoms within the parent chain ("heteroC$_{1-7}$ alkyl"). In some embodiments, a heteroalkyl group is a saturated group having 1 to 6 carbon atoms and 1 or more heteroatoms within the parent chain ("heteroC$_{1-6}$ alkyl"). In some embodiments, a heteroalkyl group is a saturated group having 1 to 5 carbon atoms and 1 or 2 heteroatoms within the parent chain ("heteroC$_{1-5}$ alkyl"). In some embodiments, a heteroalkyl group is a saturated group having 1 to 4 carbon atoms and 1 or 2 heteroatoms within the parent chain ("heteroC$_{1-4}$ alkyl"). In some embodiments, a heteroalkyl group is a saturated group having 1 to 3 carbon atoms and 1 heteroatom within the parent chain ("heteroC$_{1-3}$ alkyl"). In some embodiments, a heteroalkyl group is a saturated group having 1 to 2 carbon atoms and 1 heteroatom within the parent chain ("heteroC$_{1-2}$ alkyl"). In some embodiments, a heteroalkyl group is a saturated group having 1 carbon atom and 1 heteroatom ("heteroC$_1$ alkyl"). In some embodiments, a heteroalkyl group is a saturated group having 2 to 6 carbon atoms and 1 or 2 heteroatoms within the parent chain ("heteroC$_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted heteroC$_{1-12}$ alkyl. In certain embodiments, the heteroalkyl group is a substituted heteroC$_{1-12}$ alkyl.

The term "carbocyclyl" or "carbocyclic" refers to a radical of a non-aromatic cyclic hydrocarbon group having from 3 to 14 ring carbon atoms ("C$_{3-14}$ carbocyclyl") and zero heteroatoms in the non-aromatic ring system. In some embodiments, a carbocyclyl group has 3 to 14 ring carbon atoms ("C$_{3-14}$ carbocyclyl"). In some embodiments, a carbocyclyl group has 3 to 13 ring carbon atoms ("C$_{3-13}$ carbocyclyl"). In some embodiments, a carbocyclyl group has 3 to 12 ring carbon atoms ("C$_{3-12}$ carbocyclyl"). In some embodiments, a carbocyclyl group has 3 to 11 ring carbon atoms ("C$_{3-11}$ carbocyclyl"). In some embodiments, a carbocyclyl group has 3 to 10 ring carbon atoms ("C$_{3-10}$ carbocyclyl"). In some embodiments, a carbocyclyl group has 3 to 8 ring carbon atoms ("C$_{3-8}$ carbocyclyl"). In some embodiments, a carbocyclyl group has 3 to 7 ring carbon atoms ("C$_{3-7}$ carbocyclyl"). In some embodiments, a carbocyclyl group has 3 to 6 ring carbon atoms ("C$_{3-6}$ carbocyclyl"). In some embodiments, a carbocyclyl group has 4 to 6 ring carbon atoms ("C$_{4-6}$ carbocyclyl"). In some embodiments, a carbocyclyl group has 5 to 6 ring carbon atoms ("C$_{5-6}$ carbocyclyl"). In some embodiments, a carbocyclyl group has 5 to 10 ring carbon atoms ("C$_{5-10}$ carbocyclyl"). Exemplary C$_{3-6}$ carbocyclyl groups include cyclopropyl (C$_3$), cyclopropenyl (C$_3$), cyclobutyl (C$_4$), cyclobutenyl (C$_4$), cyclopentyl (C$_5$), cyclopentenyl (C$_5$), cyclohexyl (C$_6$), cyclohexenyl (C$_6$), cyclohexadienyl (C$_6$), and the like. Exemplary C$_{3-8}$ carbocyclyl groups include the aforementioned C$_{3-6}$ carbocyclyl groups as well as cycloheptyl (C$_7$), cycloheptenyl (C$_7$), cycloheptadienyl (C$_7$), cycloheptatrienyl (C$_7$), cyclooctyl (C$_8$), cyclooctenyl (C$_8$), bicyclo[2.2.1] heptanyl (C$_7$), bicyclo[2.2.2]octanyl (C$_8$), and the like. Exemplary C$_{3-10}$ carbocyclyl groups include the aforementioned C$_{3-8}$ carbocyclyl groups as well as cyclononyl (C$_9$), cyclononenyl (C$_9$), cyclodecyl (C$_{10}$), cyclodecenyl (C$_{10}$), octahydro-1H-indenyl (C$_9$), decahydronaphthalenyl (C$_{10}$), spiro[4.5]decanyl (C$_{10}$), and the like. Exemplary C$_{3-8}$ carbocyclyl groups include the aforementioned C$_{3-10}$ carbocyclyl groups as well as cycloundecyl (C$_{11}$), spiro[5.5]undecanyl (C$_1$), cyclododecyl (C$_{12}$), cyclododecenyl (C$_{12}$), cyclotridecane (C$_{13}$), cyclotetradecane (C$_{14}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted C$_{3-14}$ carbocyclyl. In certain embodiments, the carbocyclyl group is a substituted C$_{3-14}$ carbocyclyl.

In some embodiments, "carbocyclyl" is a monocyclic, saturated carbocyclyl group having from 3 to 14 ring carbon atoms ("C$_{3-14}$ cycloalkyl"). In some embodiments, a cycloalkyl group has 3 to 10 ring carbon atoms ("C$_{3-10}$ cycloalkyl"). In some embodiments, a cycloalkyl group has 3 to 8 ring carbon atoms ("C$_{3-8}$ cycloalkyl"). In some embodiments, a cycloalkyl group has 3 to 6 ring carbon atoms ("C$_{3-6}$ cycloalkyl"). In some embodiments, a cycloalkyl group has 4 to 6 ring carbon atoms ("C$_{4-6}$ cycloalkyl"). In some embodiments, a cycloalkyl group has 5 to 6 ring carbon atoms ("C$_{5-6}$ cycloalkyl"). In some embodiments, a cycloalkyl group has 5 to 10 ring carbon atoms ("C$_{5-10}$ cycloalkyl"). Examples of C$_{5-6}$ cycloalkyl groups include cyclopentyl (C$_5$) and cyclohexyl (C$_5$). Examples of C$_{3-6}$ cycloalkyl groups include the aforementioned C$_{5-6}$ cycloalkyl groups as well as cyclopropyl (C$_3$) and cyclobutyl (C$_4$). Examples of C$_{3-8}$ cycloalkyl groups include the aforementioned C$_{3-6}$ cycloalkyl groups as well as cycloheptyl (C$_7$) and cyclooctyl (C$_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted C$_{3-14}$ cycloalkyl. In certain embodiments, the cycloalkyl group is a substituted C$_{3-14}$ cycloalkyl. In certain embodiments, the carbocyclyl includes 0, 1, or 2 C═C double bonds in the carbocyclic ring system, as valency permits.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl. In certain embodiments, the heterocyclyl is substituted or unsubstituted, 3- to 7-membered, monocyclic heterocyclyl, wherein 1, 2, or 3 atoms in the heterocyclic ring system are independently oxygen, nitrogen, or sulfur, as valency permits.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur.

Exemplary 3-membered heterocyclyl groups containing 1 heteroatom include azirdinyl, oxiranyl, and thiiranyl. Exemplary 4-membered heterocyclyl groups containing 1 heteroatom include azetidinyl, oxetanyl, and thietanyl. Exemplary 5-membered heterocyclyl groups containing 1 heteroatom include tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include dioxolanyl, oxathiolanyl and dithiolanyl. Exemplary 5-membered heterocyclyl groups containing 3 heteroatoms include triazolinyl, oxadiazolinyl, and thiadiazolinyl. Exemplary 6-membered heterocyclyl groups containing 1 heteroatom include piperidinyl, tetrahydropyranyl, dihydropyridinyl, and thianyl. Exemplary 6-membered heterocyclyl groups containing 2 heteroatoms include piperazinyl, morpholinyl, dithianyl, and dioxanyl. Exemplary 6-membered heterocyclyl groups containing 3 heteroatoms include triazinyl. Exemplary 7-membered heterocyclyl groups containing 1 heteroatom include azepanyl, oxepanyl and thiepanyl. Exemplary 8-membered heterocyclyl groups containing 1 heteroatom include azocanyl, oxecanyl and thiocanyl. Exemplary bicyclic heterocyclyl groups include indolinyl, isoindolinyl, dihydrobenzofuranyl, dihydrobenzothienyl, tetrahydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

The term "heteroaryl" refers to a radical of a 5-14 membered monocyclic or polycyclic (e.g., bicyclic, tricyclic) 4n+2 aromatic ring system (e.g., having 6, 10, or 14π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, e.g., either the ring bearing a heteroatom (e.g., 2-indolyl) or the ring that does not contain a heteroatom (e.g., 5-indolyl). In certain embodiments, the heteroaryl is substituted or unsubstituted, 5- or 6-membered, monocyclic heteroaryl, wherein 1, 2, 3, or 4 atoms in the heteroaryl ring system are independently oxygen, nitrogen, or sulfur. In certain embodiments, the heteroaryl is substituted or unsubstituted, 9- or 10-membered, bicyclic heteroaryl, wherein 1, 2, 3, or 4 atoms in the heteroaryl ring system are independently oxygen, nitrogen, or sulfur.

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include pyrrolyl, furanyl, and thiophenyl. Exemplary 5-membered heteroaryl groups containing 2 heteroatoms include imidazolyl, pyrazolyl, oxazolyl, isoxazolyl, thiazolyl, and isothiazolyl. Exemplary 5-membered heteroaryl groups containing 3 heteroatoms include triazolyl, oxadiazolyl, and thiadiazolyl. Exemplary 5-membered heteroaryl groups containing 4 heteroatoms include tetrazolyl. Exemplary 6-membered heteroaryl groups containing 1 heteroatom include pyridinyl. Exemplary 6-membered heteroaryl groups containing 2 heteroatoms include pyridazinyl, pyrimidinyl, and pyrazinyl. Exemplary 6-membered heteroaryl groups containing 3 or 4 heteroatoms include triazinyl and tetrazinyl, respectively. Exemplary 7-membered heteroaryl groups containing 1 heteroatom include azepinyl, oxepinyl, and thiepinyl. Exemplary 5,6-bicyclic heteroaryl groups include indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include naphthyridinyl, pteridinyl, quinolinyl, isoquinolinyl, cinnolinyl, quinoxalinyl, phthalazinyl, and quinazolinyl. Exemplary tricyclic heteroaryl groups include phenanthridinyl, dibenzofuranyl, carbazolyl, acridinyl, phenothiazinyl, phenoxazinyl, and phenazinyl.

The term "boronyl" refers to boranes, boronic acids, boronic esters, borinic acids, and borinic esters.

The term "hydroxyl" or "hydroxy" refers to the group —OH.

The term "alkoxy" refers to the group where the oxygen atom directly attached to the parent molecule is substituted with a group other than hydrogen.

The term "amino" refers to the group —NH$_2$. The term "substituted amino," by extension, refers to a monosubstituted amino, a disubstituted amino, or a trisubstituted amino. In certain embodiments, the "substituted amino" is a monosubstituted amino or a disubstituted amino group.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

The terms "hydroboration," "hydroborating," and the like refers to a chemical reaction comprising the addition of hydrogen-boron to C—C, C—N, and C—O double bonds, as well as C—C triple bonds. Hydroboration is typically anti-Markovnikov, i.e. the hydrogen adds to the most substituted carbon of the double bond. Hydroboration can occur with or without a catalyst.

The term "polymer" refers to a compound comprising eleven or more covalently connected repeating units. In certain embodiments, a polymer is naturally occurring. In certain embodiments, a polymer is synthetic (i.e., not naturally occurring).

The term "repeat unit" is given its ordinary meaning in the art and refers to an atom or group of atoms (including pendant atoms or groups, if any), the repetition of which comprises a part of the essential structure of the polymer. Those of ordinary skill in the art will be able to identify and describe the repeat units that a polymer comprises. A polymer is generally formed through polymerization of a plurality of monomers (also referred to as monomeric precursors). In some embodiments, the polymer is a copolymer (e.g., formed through polymerization of two or more types of monomers). A copolymer generally has two or more types of repeat units. The two or more types of repeat units may be distributed within the polymer in any order, including random orders and periodic orders, such as alternating, block, or other repeating orders. The polymer may be formed from any suitable monomer or combination of monomers. In certain aspects, the repeat units as employed herein comprise alkylene and boronyl moieties (e.g., repeat unit Z and repeat unit X). In other aspects, the repeat units as employed herein comprise alkylene moieties, boronyl moieties, and alkenylene moieties (e.g., repeat unit Z, repeat unit X, and repeat unit Y).

"Polybutadiene" is a synthetic polymer formed from the polymerization of 1,3-butadiene. Polymerization can occur by connecting the butadiene molecules end-to-end, so-called 1,4-polymerization generating the trans or cis polybutadiene. Alternatively, polymerization can occur by connecting the butadiene molecules via 1,2 addition polymerization ("vinyl"). Polybutadienes may have any degree of branching and any molecular weight. Of particular interest to the present disclosure is polybutadiene with a high degree (e.g., >80%, >90%, >95%) trans connectivity. Polybutadiene may have any ratio of 1,4 (trans and cis) and 1,2 (vinyl) groups, any molecular weight, and any cis or trans composition. In some embodiments, the polybutadiene may have $M_w$ of 300 k or 200 k. In some embodiments, the polybutadiene may be cis-rich or a cis and trans mixture.

The term "electrolyte" refers to a nonmetallic electric conductor in which current is carried by the movement of ions. Electrolytes are capable of transporting electric charge. Solid-state electrolytes are solids that are electric conductors capable of transporting electric charge. Solid-state polymer electrolytes are polymer-based solids that are electric conductors capable of transporting electric charge.

The term "polymer film" or "film" refers to a layer of polymer. Generally, a film has a thickness of about 100 micron or less, about 75 micron or less, about 50 micron or less, about 35 micron or less, about 20 micron or less, about 15 micron or less, about 10 micron or less, or about 5 micron or less. The film can be formed by any method known in the art. The film may comprise additional components such as salts (i.e., the film comprises polymer doped with, for example, Li$^+$).

The term "ionic conductivity" is given its ordinary meaning in the art and refers to ability of ions to migrate and thereby conduct electrical current. Ionic conductivity may be measured according to any method known in the art.

The term "electronic conductivity" is given its ordinary meaning in the art and refers to the ability of electrons to migrate and thereby conduct electrical current. Electronic conductivity may be measured according to any method known in the art, such as electrochemical impedance spectroscopy.

The term "electroactive species" refers to any species which is electrically active or responsive. Further, electroactive species refers to the component of an electrochemical cell that is transported between a negative electrode (commonly considered an anode) and a positive electrode (commonly considered a cathode) through an electrolyte.

The term "electrochemical cell" refers to a device capable of either generating electrical energy from chemical reactions or using electrical energy to cause chemical reactions. An electrochemical cell generally functions through transport of an electroactive species between a negative electrode (commonly considered an anode) and a positive electrode (commonly considered a cathode) through an electrolyte.

The term "cast" or "casting" refers to is a manufacturing process used to make polymer films.

The disclosure is not intended to be limited in any manner by the above exemplary listing of substituents. Additional terms may be defined in other sections of this disclosure.

DETAILED DESCRIPTION OF CERTAIN EMBODIMENTS

Before the disclosed systems, polymers, electrolytes, combinations, compositions, methods, uses, and kits are described in more detail, it should be understood that the aspects described herein are not limited to specific embodiments, methods, apparati, or configurations, and as such can, of course, vary. It is also to be understood that the terminology used herein is for the purpose of describing particular aspects only and, unless specifically defined herein, is not intended to be limiting.

Described herein are solid-state polymer electrolytes, as well as methods of preparing and using the same. The polymer electrolytes demonstrate high ion conductivity at a variety of temperatures, in some cases, approximately or surpassing the ion conductivity of PEO. The conductivity of the solid-state electrolytes can be tuned based on the composition of the polymer. Due to their high ion conductivity, these solid-state electrolytes may be appropriate for use in electrochemical cells.

Polymer-Based Solid-State Electrolytes

Embodiments described herein generally relate to polymers suitable for use as solid-state electrolytes. Certain embodiments are related to polymer layers suitable for use as an electrolyte in an electrochemical cell. In some cases, the polymers described herein have certain characteristics that are advantageous for electrolytes, such as relatively high ionic conductivity (e.g., at least about 10$^{-9}$ S/cm).

In certain embodiments, the present disclosure provides a solid-state electrolyte comprising an ion and a polymer, wherein the polymer comprises alkylene and boronyl moieties. In some embodiments, the polymer further comprises alkenylene moieties. In some embodiments, the polymer is a polybutadiene polymer.

In certain embodiments, the polybutadiene polymer is a cis and trans mixture. In some embodiments, the polybutadiene polymer is cis-rich. In some embodiments, the polybutadiene polymer is trans-rich. In some embodiments, the polybutadiene comprises less than 50% vinyl groups. In some embodiments, the polybutadiene comprises 20% vinyl groups.

In some embodiments, the -polybutadiene polymer is trans-rich (e.g., about 20%, about 30%, about 40%, about 50%, or about 60% trans) In some embodiments, the -polybutadiene polymer is cis-rich (e.g., about 20%, about 30%, about 40%, about 50%, about 60%, about 70%, about 80%, about 90%, about 95%, about 98%, about 99% cis). In certain embodiments, the -polybutadiene polymer is a cis and trans mixture.

In some embodiments, the -polybutadiene comprises less than 70%, 60%, 50%, 40%, 30%, 20%, or 10% vinyl groups. In some embodiments, the -polybutadiene comprises less than 5% vinyl groups. In some embodiments, the -polybutadiene comprises less than 2% vinyl groups. In some embodiments, the -polybutadiene comprises less than 50% vinyl groups and about 50% total of cis and trans. In some embodiments, the -polybutadiene comprises 20% vinyl groups and 80% total of cis and trans.

In certain embodiments, the polybutadiene has a high molecular weight. In some embodiments, the $M_w$ is 300K. In some embodiments, the $M_w$ is 200K. In some embodiments, the $M_w$ is about 5000. In some embodiments, the $M_w$ is about 5100. In some embodiments, the $M_w$ is about 5150.

In some embodiments, the polybutadiene has a $M_w$ of 300 k and is cis-rich. In certain embodiments, the polybutadiene has a $M_w$ of 200 k and is a cis and trans mixture. In some embodiments, the $M_w$ is about 5000 and is a cis and trans mixture. In some embodiments, the $M_w$ is about 5100 and is a cis and trans mixture. In some embodiments, the $M_w$ is about 5150 and is a cis and trans mixture.

In some embodiments, the polybutadiene has an $M_n$ of 5000 and with 80% cis and trans-1,4 and 20% vinyl. In some embodiments, the polybutadiene has an $M_w$ of 5150 and with 80% cis and trans-1,4 and 20% vinyl.

In some embodiments, the molecular mass of the polybutadiene is uniformed. In certain embodiments, the polydispersity index (PDI) is close to 1. In some embodiments, the PDI is 1 to 1.1. In certain embodiments, the PDI is 1.03.

In certain embodiments, a polymer of the disclosure comprises terminal methyl groups, repeat unit Z:

repeat unit X:

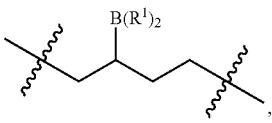

and repeat unit Y:

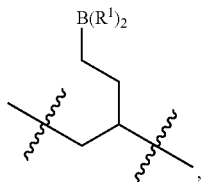

wherein
each $R^1$ is independently $C_{1-20}$ alkyl, —$OR^2$, heteroC$_{1-20}$ alkyl, $C_{3-10}$ carbocyclyl, or 3-14 membered heterocyclyl, or two $R^1$ groups on the same boron are joined to form a 3-14 membered monocyclic, bicyclic, or tricyclic heterocyclyl moiety; and
each $R^2$ is independently $C_{1-20}$ alkyl, heteroC$_{1-20}$ alkyl, $C_{3-10}$ carbocyclyl, 3-14 membered heterocyclyl, $C_{6-14}$ aryl, or 5-14 membered heteroaryl,
or salt thereof.

In some embodiments, a polymer of the disclosure comprises terminal methyl groups, repeat unit Z:

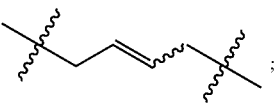

and repeat unit X:

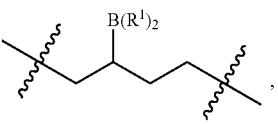

wherein
each $R^1$ is independently $C_{1-20}$ alkyl, —$OR^2$, heteroC$_{1-20}$ alkyl, $C_{3-10}$ carbocyclyl, or 3-14 membered heterocyclyl, or two $R^1$ groups on the same boron are joined to form a 3-14 membered monocyclic, bicyclic, or tricyclic heterocyclyl moiety; and
each $R^2$ is independently $C_{1-20}$ alkyl, heteroC$_{1-20}$ alkyl, $C_{3-10}$ carbocyclyl, 3-14 membered heterocyclyl, $C_{6-14}$ aryl, or 5-14 membered heteroaryl, or salt thereof.

In some embodiments, the terminal methyl groups are unfunctionalized (i.e., the terminal groups are —$CH_3$). In certain embodiments, the terminal methyl groups are functionalized. In certain embodiments, the terminal methyl groups are functionalized with hydroxy, alkoxy, carboxyl, amino, and/or substituted amino groups. In certain embodiments, the terminal methyl groups are functionalized with —OBBN.

In some embodiments, the terminal methyl groups are optionally substituted. In certain embodiments, the terminal methyl groups are optionally substituted with hydroxy, carboxyl, amino, substituted amino, alkoxy, or —O-boronyl.

In certain embodiments, the molar ratio of repeat units Z to X to Y is tunable. The tunability of the molar ratio of the repeat units allows for varying the conductivity of the electrolyte. The molar ratio of repeat units Z to X to Y is varied by altering the amount of borane or organoborane during hydroboration.

In certain embodiments the molar ratio of repeat unit Z to repeat unit X is about 10:1 to 1:10. In some embodiments, the molar ratio of repeat unit Z to repeat unit X is about 9:2 to 1:2. In some embodiments, the molar ratio of repeat unit Z to repeat unit X is about 11:4. In certain embodiments, the molar ratio of repeat unit Z to repeat unit X is about 8:2. In certain embodiments, the molar ratio of repeat unit Z to repeat unit X is about 3:2. In some embodiments, the molar ratio of repeat unit Z to repeat unit X is about 15:4. In some embodiments, the molar ratio of repeat unit X to repeat unit Y is about 9:1 to 2:9. In some embodiments, the molar ratio of repeat unit X to repeat unit Y is about 4:5. In some embodiments, the molar ratio of repeat unit X to repeat unit Y is about 2:5. In some embodiments, the molar ratio of repeat unit X to repeat unit Y is about 4:1.

In some embodiments, the molar ratio of the total of repeat units Z and Y to repeat unit X is about 99:1. In some embodiments, the molar ratio of the total of repeat units Z and Y to repeat unit X is about 90:1. In some embodiments, the molar ratio of the total of repeat units Z and Y to repeat unit X is about 10:1. In some embodiments, the molar ratio of the total of repeat units Z and Y to repeat unit X is about 8:1. In some embodiments, the molar ratio of the total of repeat units Z and Y to repeat unit X is about 6:1. In some embodiments, the molar ratio of the total of repeat units Z and Y to repeat unit X is about 4:1. In some embodiments, the molar ratio of the total of repeat units Z and Y to repeat unit X is about 2:1. In some embodiments, the molar ratio of the total of repeat units Z and Y to repeat unit X is about 1:1. In some embodiments, the molar ratio of the total of repeat units Z and Y to repeat unit X is about 1:2. In some embodiments, the molar ratio of the total of repeat units Z and Y to repeat unit X is about 2:3. In some embodiments, the molar ratio of the total of repeat units Z and Y to repeat unit X is about 3:7.

In some embodiments, the molar ratio of repeat unit Z to repeat unit X to repeat unit Y is about 11:4:5. In certain embodiments, the molar ratio of repeat unit Z to repeat unit X to repeat unit Y is about 3:2:5. In some embodiments, the molar ratio of repeat unit Z to repeat unit X to repeat unit Y is about 15:4:1.

In some embodiments, the alkylene moiety is a $C_{2-1000}$ alkylene. In some embodiments, the alkylene moiety is a $C_{2-4}$ alkylene. In some embodiments, the alkylene moiety is a $C_{2-10}$ alkylene. In some embodiments, the alkylene moiety is a $C_{10-20}$ alkylene. In some embodiments, the alkylene moiety is a $C_{10-40}$ alkylene. In some embodiments, the alkylene moiety is a $C_{10-100}$ alkylene. In some embodiments, the alkylene moiety is a $C_{10-250}$ alkylene. In some embodiments, the alkylene moiety is a $C_{10-500}$ alkylene. In some embodiments, the alkylene moiety is linear. In certain embodiments, the alkylene is moiety is branched. In some embodiments, the alkylene moiety is predominately linear (e.g., >90% linear, >92% linear, >95% linear, >98% linear, >95% linear).

In certain embodiments, the boronyl moieties are attached to the alkylene moiety. In some embodiments, the boronyl moieties are attached to the alkylene moiety through the boron. In certain embodiments, the boronyl moieties are attached to the alkylene moiety through the boron (e.g., —B(R$^1$)$_2$).

In some embodiments, the alkenylene moiety is a $C_{2-1000}$ alkenylene. In some embodiments, the alkenylene moiety is a $C_{10-20}$ alkenylene. In some embodiments, the alkenylene moiety is a $C_{10-40}$ alkenylene. In some embodiments, the alkylene moiety is a $C_{10-100}$ alkenylene. In some embodiments, the alkenylene moiety is a $C_{10-250}$ alkenylene. In some embodiments, the alkenylene moiety is a $C_{10-500}$ alkenylene. In some embodiments, the alkenylene moiety is linear. In certain embodiments, the alkenylene is moiety is branched. In some embodiments, the alkenylene moiety is predominately linear (e.g., >90% linear, >92% linear, >95% linear, >98% linear, >95% linear). In certain embodiments, the alkenylene moiety is predominately linear with branching of short chains (e.g., $C_{2-8}$, $C_{2-4}$).

In some embodiments, each instance of R$^1$ is the same. In certain embodiments, each instance of R$^1$ is different. In certain embodiments, each instance of R$^1$ is independently selected.

In certain embodiments, each R$^1$ is independently $C_{1-20}$ alkyl, —OR$^2$, heteroC$_{1-20}$ alkyl, $C_{3-10}$ carbocyclyl, 3-14 membered heterocyclyl, or two R$^1$ groups on the same boron are joined to form a 3-14 membered monocyclic, bicyclic, or tricyclic heterocyclyl moiety. In some embodiments, each R$^1$ is independently $C_{1-20}$ alkyl, —OR$^2$, heteroC$_{1-20}$ alkyl, $C_{3-10}$ carbocyclyl, 3-14 membered heterocyclyl.

In some embodiments, R$^1$ is $C_{1-20}$ alkyl. In certain embodiments, R$^1$ is a linear or branched $C_{1-8}$alkyl. In some embodiments, R$^1$ is methyl, ethyl, n-propyl, isopropyl, n-butyl, isobutyl, sec-butyl, tert-butyl, n-pentyl, sec-isopentyl, neopentyl, isopentyl, n-hexyl, or branched hexyl (e.g., —C(CH$_3$)$_2$CH(CH$_3$)$_2$). In some embodiments, R$^1$ is

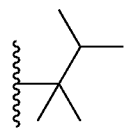

In certain embodiments, R$^1$ is

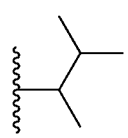

In some embodiments, R$^1$ is —OR$^2$.

In some embodiments, each instance of R$^2$ is the same. In certain embodiments, each instance of R$^2$ is different. In certain embodiments, each instance of R$^2$ is independently selected.

In some embodiments, R$^1$ is heteroC$_{1-20}$ alkyl. In certain embodiments, R$^1$ is heteroC$_{1-8}$alkyl. In some embodiments, R$^1$ is heteroC$_{1-6}$ alkyl. In certain embodiments, a heteroC$_{1-20}$ alkyl comprises one or more of oxygen, nitrogen, sulfur, or boron. In some embodiments, a heteroC$_{1-20}$ alkyl comprises oxygen. In certain embodiments, R$^1$ is methoxy, ethoxy, or propoxy. In some embodiments, R$^1$ is hydroxymethyl, hydroxyethyl, or hydroxypropyl.

In some embodiments, R$^1$ is $C_{3-10}$ carbocyclyl. In some embodiments, R$^1$ is $C_{3-6}$ carbocyclyl. In certain embodiments, R$^1$ is cyclopropyl, cyclobutyl, cyclopentyl, or cyclohexyl.

In certain embodiments, R$^1$ is 3-14 membered heterocyclyl. In certain embodiments, R$^1$ is 5-6 membered heterocyclyl. In some embodiments, R$^1$ is pyrrolidinyl, tetrahydrofuranyl, tetrahydrothiophenyl. In certain embodiments, R$^1$ is piperidinyl, piperazinyl, tetrahydropyranyl, thianyl, morpholinyl, or thiomorpholinyl.

In certain embodiments, two R$^1$ groups on the same boron are joined to form a 3-14 membered monocyclic, bicyclic, or tricyclic heterocyclyl moiety. In certain embodiments, two R$^1$ groups on the same boron are joined to form a 3-14 membered monocyclic heterocyclyl moiety. In certain embodiments, two R$^1$ groups on the same boron are joined to form a 3-6 membered monocyclic heterocyclyl moiety. In some embodiments, —B(R$^1$)$_2$ is of the formula:

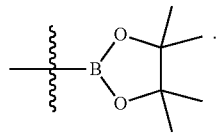 [SMILES: *B1OC(C)(C)C(C)(C)O1]

In certain embodiments, two R$^1$ groups on the same boron are joined to form a 3-14 membered bicyclic heterocyclyl moiety. In certain embodiments, two R$^1$ groups on the same boron are joined to form a 6-14 membered bicyclic heterocyclyl moiety. In certain embodiments, two R$^1$ groups on the same boron are joined to form a 3-14 membered bicyclic heterocyclyl is fused bicyclic heterocyclyl. In certain embodiments, two R$^1$ groups on the same boron are joined to form a 6-14 membered bicyclic heterocyclyl is fused bicyclic heterocyclyl. In some embodiments, —B(R$^1$)$_2$ is of the formula:

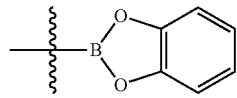

In certain embodiments, two R$^1$ groups on the same boron are joined to form a 3-14 membered bicyclic heterocyclyl is bridged bicyclic heterocyclyl. In some embodiments, —B(R$^1$)$_2$ is of the formula:

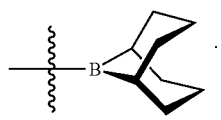

In certain embodiments, each R$^2$ is independently $C_{1-20}$ alkyl, heteroC$_{1-20}$ alkyl, $C_{3-10}$ carbocyclyl, 3-14 membered heterocyclyl, $C_{6-14}$ aryl, or 5-14 membered heteroaryl. In some embodiments, $R^2$ is $C_{1-20}$ alkyl, heteroC$_{1-20}$ alkyl, $C_{3-10}$ carbocyclyl, or 3-14 membered heterocyclyl.

In some embodiments, $R^2$ is $C_{1-20}$ alkyl. In certain embodiments, $R^2$ is a linear or branched $C_{1-8}$alkyl. In some embodiments, $R^2$ is methyl, ethyl, n-propyl, isopropyl, n-butyl, isobutyl, sec-butyl, tert-butyl, n-pentyl, sec-isopentyl, neopentyl, isopentyl, n-hexyl, or branched hexyl (e.g., —C(CH$_3$)$_2$CH(CH$_3$)$_2$).

In some embodiments, $R^2$ is heteroC$_{1-20}$ alkyl. In certain embodiments, $R^1$ is heteroC$_{1-8}$alkyl. In some embodiments, $R^2$ is heteroC$_{1-6}$ alkyl. In certain embodiments, a heteroC$_{1-20}$ alkyl comprises one or more of oxygen, nitrogen, sulfur, or boron. In some embodiments, a heteroC$_{1-20}$ alkyl comprises oxygen. In certain embodiments, $R^2$ is methoxy, ethoxy, or propoxy. In some embodiments, $R^1$ is hydroxymethyl, hydroxyethyl, or hydroxypropyl.

In some embodiments, $R^2$ is $C_{3-10}$ carbocyclyl. In some embodiments, $R^2$ is $C_{3-6}$ carbocyclyl. In certain embodiments, $R^2$ is cyclopropyl, cyclobutyl, cyclopentyl, or cyclohexyl.

In certain embodiments, $R^2$ is 3-14 membered heterocyclyl. In certain embodiments, $R^1$ is 5-6 membered heterocyclyl. In some embodiments, $R^2$ is pyrrolidinyl, tetrahydrofuranyl, tetrahydrothiophenyl. In certain embodiments, $R^2$ is piperidinyl, piperazinyl, tetrahydropyranyl, thianyl, morpholinyl, or thiomorpholinyl.

In some embodiments, $R^2$ is $C_{6-14}$ aryl. In certain embodiments, $R^2$ is phenyl.

In certain embodiments, $R^2$ is 5-14 membered heteroaryl. In certain embodiments, $R^2$ is 5-membered heteroaryl. In certain embodiments, $R^2$ is imidazolyl or thiazolyl. In certain embodiments, $R^2$ is 6-membered heteroaryl. In some embodiments, $R^2$ is pyridinyl or pyrimidinyl.

In certain embodiments, $R^1$ is —OR$^2$; and $R^2$ is methyl.

In some embodiments, the borylated-polybutadiene polymer is trans-rich (e.g., about 20%, about 30%, about 40%, about 50%, or about 60% trans) In some embodiments, the borylated-polybutadiene polymer is cis-rich (e.g., about 20%, about 30%, about 40%, about 50%, about 60%, about 70%, about 80%, about 90%, about 95%, about 98%, about 99% cis). In certain embodiments, the borylated-polybutadiene polymer is a cis and trans mixture.

In some embodiments, the borylated-polybutadiene comprises less than 70%, 60%, 50%, 40%, 30%, 20%, or 10% vinyl groups. In some embodiments, the borylated-polybutadiene comprises less than 5% vinyl groups. In some embodiments, the borylated-polybutadiene comprises less than 2% vinyl groups. In some embodiments, the borylated-polybutadiene comprises less than 50% vinyl groups and about 50% total of cis and trans. In some embodiments, the borylated-polybutadiene comprises 20% vinyl groups and 80% total of cis and trans.

In certain embodiments, the borylate-polybutadiene has a high molecular weight. In some embodiments, the $M_w$ is 300K. In some embodiments, the $M_w$ is 200K. In some embodiments, the $M_w$ is about 5000. In some embodiments, the $M_w$ is about 5100. In some embodiments, the $M_w$ is about 5150.

In some embodiments, the borylate-polybutadiene has a $M_w$ of 300 k and is cis-rich. In certain embodiments, the borylate-polybutadiene has a $M_w$ of 200 k and is a cis and trans mixture. In some embodiments, the $M_w$ is about 5000 and is a cis and trans mixture. In some embodiments, the $M_w$ is about 5100 and is a cis and trans mixture. In some embodiments, the $M_w$ is about 5150 and is a cis and trans mixture.

In some embodiments, the borylate-polybutadiene has an $M_n$ of 5000 and with 80% cis and trans-1,4 and 20% vinyl. In some embodiments, the borylate-polybutadiene has an $M_w$ of 5150 and with 80% cis and trans-1,4 and 20% vinyl.

In some embodiments, the molecular mass of the borylated-polybutadiene is uniformed. In certain embodiments, the polydispersity index (PDI) is close to 1. In some embodiments, the PDI is 1 to 1.1. In certain embodiments, the PDI is 1.03.

In certain embodiments, the polymer is doped with one or more dopants (e.g., to alter the ionic conductivity of the polymer). In some embodiments, the dopant is an electroactive species associated with the polymer. An electrochemical cell generally functions through transport of an electroactive species between a negative electrode (commonly considered an anode) and a positive electrode (commonly considered a cathode) through an electrolyte. In certain embodiments, doping a polymer described herein with an electroactive species may advantageously increase the ionic conductivity of the polymer. In some cases, the polymer may be doped with an electroactive species of an electrochemical cell prior to use of the polymer as an electrolyte in the electrochemical cell (e.g., prior to operation of the electrochemical cell). In some embodiments, the electroactive species is an ion.

In some embodiments, the ion is a cation. Examples of suitable cations include, but are not limited to, Li$^+$, Na$^+$, K$^+$, Ag$^+$, Mg$^{2+}$, Ca$^{2+}$, Ba$^{2+}$, and Zn$^{2+}$. In some embodiments, the ion is an anion. In certain embodiments, the ion is Li$^+$. In some embodiments, the ion is Na$^+$. In certain embodiments, the ion is K$^+$. In some embodiments, the ion is Ca$^{2+}$. In certain embodiments, the ion is Zn$^{2+}$. Examples of suitable anions include, but are not limited to TFSI$^-$, FSI$^-$, BOB$^-$, DFOB$^-$, PF$_6^-$, AsF$_6^-$, BF$_4^-$, C$_{104}^-$, Br$^-$, Cl$^-$, I$^-$, TFO$^-$, TFA$^-$, TCM$^-$, TDI$^-$. In some embodiments, the ion is a mixture of ions. In some embodiments, the ion is provided via a salt solution. In some embodiments, the ion is provided via multiple salt solutions.

In certain embodiments, the polymer film has a ratio of boron (within the polymer) to ion of about 20:1 to about 1:20. In some embodiments, the polymer film has a ratio of B:cation of about 20:1. In certain embodiments, the polymer film has a ratio of B:cation of about 10:1. In some embodiments, the polymer film has a ratio of B:cation of about 7:1. In certain embodiments, the polymer film has a ratio of B:cation of about 6.7:1. In certain embodiments, the polymer film has a ratio of B:cation of about 6:1. In certain embodiments, the polymer film has a ratio of B:cation of about 5.9:1. In some embodiments, the polymer film has a ratio of B:cation of about 5:1. In some embodiments, the polymer film has a ratio of B:cation of about 1:1. In some embodiments, the polymer film has a ratio of B:cation of about 1:2. In some embodiments, the polymer film has a ratio of B:cation of about 1:4.

In certain embodiments, the polymer film has a ratio of boron (within the polymer) to lithium ion of about 20:1 to about 1:20. In some embodiments, the polymer film has a ratio of B:Li of about 20:1. In certain embodiments, the polymer film has a ratio of B:Li of about 10:1. In some embodiments, the polymer film has a ratio of B:Li of about 7:1. In certain embodiments, the polymer film has a ratio of B:Li of about 6.7:1. In some embodiments, the polymer film has a ratio of B:Li of about 6:1. In certain embodiments, the polymer film has a ratio of B:Li of about 5.9:1. In some embodiments, the polymer film has a ratio of B:Li of about 5:1. In some embodiments, the polymer film has a ratio of B:Li of about 1:1. In some embodiments, the polymer film has a ratio of B:Li of about 1:2. In some embodiments, the polymer film has a ratio of B:Li of about 1:4.

In some embodiments, the chemical structure of a polymer may be substantially unchanged after doping. It may be advantageous, in some cases, to preserve the chemical structure of the polymer in order to retain certain structures that may be beneficial for ion transport (e.g., boronyl moieties). In some embodiments, the polymer remains mechanically intact after doping (i.e., no change in strength, stiffness/rigidity, or toughness).

In some embodiments, the number density of ions in the polymer film may be relatively high. For example, in some cases, the number density of ions in the polymer film is at least about $1.0 \times 10^{18}$ atoms/cm$^3$, at least about $1.0 \times 10^{19}$ atoms/cm$^3$, at least about $1.0 \times 10^{20}$ atoms/cm$^3$, at least about $2.0 \times 10^{20}$ atoms/cm$^3$, at least about $3.0 \times 10^{20}$ atoms/cm$^3$, at least about $4.0 \times 10^{20}$ atoms/cm$^3$, at least about $5.0 \times 10^{20}$ atoms/cm$^3$, at least about $6.0 \times 10^{20}$ atoms/cm$^3$, or at least about $1.0 \times 10^{21}$ atoms/cm$^3$. Correspondingly, in some cases, the number density of ions in the polymer film is about $1.0 \times 10^{21}$ atoms/cm$^3$ or less, about $6.0 \times 10^{20}$ atoms/cm$^3$ or less, about $5.0 \times 10^{20}$ atoms/cm$^3$ or less, about $4.0 \times 10^{20}$ atoms/cm$^3$ or less, about $3.0 \times 10^{20}$ atoms/cm$^3$ or less, about $2.0 \times 10^{20}$ atoms/cm$^3$ or less, about $1.0 \times 10^{20}$ atoms/cm$^3$ or less, about $1.0 \times 10^{19}$ atoms/cm$^3$ or less, or about $1.0 \times 10^{18}$ atoms/cm$^3$ or less. Combinations of the above-noted ranges are also possible (e.g., about $1.0 \times 10^{18}$ atoms/cm$^3$ to about $1.0 \times 10^{21}$ atoms/cm$^3$). In some embodiments, the number density of ions in the polymer film is in the range of about $1.0 \times 10^{18}$ atoms/cm$^3$ to about $1.0 \times 10^{19}$ atoms/cm$^3$, about $1.0 \times 10^{18}$ atoms/cm$^3$ to about $1.0 \times 10^{20}$ atoms/cm$^3$, about $1.0 \times 10^{18}$ atoms/cm$^3$ to about $5.0 \times 10^{20}$ atoms/cm$^3$, about $1.0 \times 10^{18}$ atoms/cm$^3$ to about $1.0 \times 10^{21}$ atoms/cm$^3$, about $1.0 \times 10^{19}$ atoms/cm$^3$ to about $1.0 \times 10^{20}$ atoms/cm$^3$, about $1.0 \times 10^{19}$ atoms/cm$^3$ to about $5.0 \times 10^{20}$ atoms/cm$^3$, about $1.0 \times 10^{19}$ atoms/cm$^3$ to about $1.0 \times 10^{21}$ atoms/cm$^3$, or about $1.0 \times 10^{20}$ atoms/cm$^3$ to about $1.0 \times 10^{21}$ atoms/cm$^3$. One method of quantifying the number of ions present in a polymer film is inductively coupled plasma (ICP (e.g., ICP-OES or ICP-MS)). In some cases, ICP-MS may be capable of detecting trace quantities of atoms.

In some embodiments, the number density of lithium ions in the polymer film may be relatively high (e.g., greater than $1.0 \times 10^{20}$ Li atoms/cm$^3$). In some embodiments, the number density of Li atoms in the polymer film may be at least about $1.0 \times 10^{20}$ Li atoms/cm$^3$, at least about $2.0 \times 10^{20}$ Li atoms/cm$^3$, at least about $4.0 \times 10^{20}$ Li atoms/cm$^3$, at least about $5.0 \times 10^{20}$ Li atoms/cm$^3$, at least about $6.0 \times 10^{20}$ Li atoms/cm$^3$, at least about $8.0 \times 10^{20}$ Li atoms/cm$^3$, or at least about $1.0 \times 10^{21}$ Li atoms/cm$^3$. Correspondingly, in some cases, the number density of Li atoms in the polymer film may be less than about $1.0 \times 10^{21}$ Li atoms/cm$^3$, less than about $8.0 \times 10^{20}$ Li atoms/cm$^3$, less than about $6.0 \times 10^{20}$ Li atoms/cm$^3$, less than about $5.0 \times 10^{20}$ Li atoms/cm$^3$, less than about $4.0 \times 10^{20}$ Li atoms/cm$^3$, less than about $2.0 \times 10^{20}$ Li atoms/cm$^3$, or less than about $1.0 \times 10^{20}$ Li atoms/cm$^3$. Combinations of the above-noted ranges are also possible (e.g., about $1.0 \times 10^{20}$ Li atoms/cm$^3$ to about $1.0 \times 10^{21}$ Li atoms/cm$^3$). In some embodiments, the number density of Li atoms in the polymer film is in the range of about $1.0 \times 10^{20}$ Li atoms/cm$^3$ to about $2.0 \times 10^{20}$ Li atoms/cm$^3$, about $1.0 \times 10^{20}$ Li atoms/cm$^3$ to about $5.0 \times 10^{20}$ Li atoms/cm$^3$, or $1.0 \times 10^{20}$ Li atoms/cm$^3$ to about $1.0 \times 10^{21}$ Li atoms/cm$^3$.

In certain embodiments, the weight percent of lithium ions in the polymer film may be between about 5% and 100%. In some embodiments, the weight percent of lithium ions in the polymer film may between about 5% to about 90%, about 5% to about 70%, about 5% to about 30%, about 5% to about 50%, or about 5% to about 15%. In some embodiments, the weight percent of lithium ions in the polymer film may be about 62%. In certain embodiments, the weight percent of lithium ions in the polymer film may be about 20%. In some embodiments, the weight percent of lithium ions in the polymer film may be about 14%. In certain embodiments, the weight percent of lithium ions in the polymer film may be about 8%.

It has been recognized that it may be advantageous for a polymer film to have a relatively high ionic conductivity at least because a relatively high ionic conductivity may lead to low internal resistance, high energy density, high discharge capacity, and/or high rate capability in an electrochemical cell. Additionally, a relatively high ionic conductivity may avoid deleterious development of concentration polarization at an electrode of the electrochemical cell.

In some embodiments, the polymer film has a relatively high ionic conductivity at about room temperature (e.g., about 25° C.). It has been recognized that it may be important for certain applications (e.g., sensing, medical implants) for the polymer film to have relatively high ionic conductivity at room temperature. In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 25° C. Correspondingly, in some cases, the polymer film has an ionic conductivity of less than about $10^{-4}$ S/cm, less than about $10^{-5}$ S/cm, less than about $10^{-6}$ S/cm, less than about $10^{-7}$ S/cm, less than about $10^{-8}$ S/cm, less than about $10^{-9}$ S/cm, or less than about $10^{-10}$ S/cm at 25° C. Combinations of the above-noted ranges are also possible (e.g., about $10^{-8}$ S/cm to about $10^{-6}$ S/cm). For example, the polymer film may have an ionic conductivity in the range of about $10^{-10}$ S/cm to about $10^{-4}$ S/cm, about $10^{-9}$ S/cm to about $10^{-4}$ S/cm, $10^{-8}$ S/cm to about $10^{-4}$ S/cm, $10^{-7}$ S/cm to about $10^{-4}$ S/cm, $10^{-6}$ S/cm to about $10^{-4}$ S/cm, about $10^{-10}$ S/cm to about $10^{-6}$ S/cm, about $10^{-9}$ S/cm to about $10^{-6}$ S/cm, or about $10^{-8}$ S/cm to about $10^{-6}$ S/cm at 25° C. In some cases, the polymer film has an ionic conductivity of at least about $10^{-6}$ S/cm at 25° C. In certain cases, the polymer film has an ionic conductivity of at least about $10^{-5}$ S/cm at 25° C. In some cases, the polymer film has an ionic conductivity of at least about $10^{-4}$ S/cm at 25° C.

In some embodiments, the polymer film has an ionic conductivity at a temperature of about 200° C. or less, about 150° C. or less, about 100° C. or less, about 50° C. or less, about 25° C. or less, or about 15° C. or less.

In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 30° C. In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 40° C. In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 50° C. In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 60° C.

In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 70° C. In some embodiments, the polymer film has an ionic conductivity of at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 80° C. In some embodiments, the polymer film has an ionic conductivity at least about $10^{-10}$ S/cm, at least about $10^{-9}$ S/cm, at least about $10^{-8}$ S/cm, at least about $10^{-7}$ S/cm, at least about $10^{-6}$ S/cm, at least about $10^{-5}$ S/cm, or at least about $10^{-4}$ S/cm at 90° C.

In some embodiments, the polymer film has an ionic conductivity similar to PEO. PEO exhibits a conductivity of only about $10^{-8}$ to $10^{-6}$ S/cm at room temperature. In certain embodiments, the polymer film has an ionic conductivity greater than PEO.

Methods of Preparing a Solid-State Electrolyte

In some aspects, the disclosure further provides methods of preparing a solid-state electrolyte as described herein. Generally, this is accomplished by forming the polymer, mixing the polymer and ion and forming a polymer film. Additional processing steps to may include annealing and drying the film.

In some aspects, a solid-state electrolyte as described herein is by a process comprising the steps of: (i) hydroborating polybutadiene with a borane or organoborane to yield a borylated-polybutadiene, (ii) mixing the borylated-polybutadiene and a ion in a solvent, and (iii) forming a film. In some aspects, the film is formed by casting the solvent mixture to form a film. In some aspects, a solid-state electrolyte as described herein is by a process further comprising the steps of: (i) annealing the film, (ii) pressing the film, and (iii) drying the film.

In some embodiments, the method of preparing a solid-state electrolyte comprises hydroborating polybutadiene with a borane or organoborane to yield a borylated-polybutadiene. In certain embodiments the borane or organoborane, either of which may be referred to as a hydroboration reagent, is 9-borabicyclo(3.3.1)nonane (9-BBN), dimesitylborane, disiamylborane, diethylborane, thexylborane, pinacolborane (HBpin), or catecholborane (HBcat). In certain embodiments, the hydroboration occurs via reacting polybutadiene with 9-BBN in solvent. In some embodiments, the hydroboration occurs without a catalyst. In certain embodiments, the hydroboration occurs with a catalyst (i.e., in order to speed up the reaction or to initiate the reaction (e.g., a metal-based catalyst (e.g., a Rh-based catalyst))).

In some embodiments, the methods further comprise the step of exposing the polymer to a solution comprising an ion, thereby doping the polymer layer with the electroactive species. In some embodiments, the ion is $Li^+$, $Na^+$, $K^+$, $Ag^+$, $Mg^{2+}$, $Ca^{2+}$, $Ba^{2+}$, and $Zn^{2+}$. In some embodiments, the ion is $Li^+$. In some such embodiments, the solution comprises a lithium salt. Examples of suitable lithium salts include, but are not limited to, lithium perchlorate ($LiClO_4$), lithium tetrafluoroborate ($LiBF_4$), lithium bis(trifluoromethane sulfonyl) imide (LiTFSI), Lithium bis(fluorosulfonyl)imide (LiFSI), Lithium trifluoromethanesulfonate (LiTFO), Lithium trifluoroacetate (LiTFA), lithium tricyanomethanide (LiTCM), lithium 4,5-dicyano-2-(trifluoromethyl)imidazolide (LiTDI), lithium chloride (LiCl), Lithium Bromide (LiBr), Lithium Iodide (LiI), lithium hexafluorphosphate ($LiPF_6$), Lithium hexafluoroarsenate ($LiAsF_6$), Lithium difluoro(oxalato)borate (LiDFOB) and lithium bis(oxalate)borate (LiBOB). In some cases, the solution further comprises a solvent. Any solvent capable of solvating the lithium salt may be used. Non-limiting examples of suitable solvents include tetrahydrofuran (THF), 2-methyl-THF, propylene carbonate, ethylene carbonate, dimethyl carbonate, dimethoxyethane, hexanes, dichloromethane, diethylether and acetonitrile, or combinations thereof. In certain embodiments, the solvent is 2-methyl-THF. In some embodiments, the solvent is an ionic liquid (e.g., a salt in liquid state). Non-limiting examples of suitable ionic liquids include 1-butyl-3-methylimidazolium tetrafluoroborate.

In some embodiments, the polymer layer is exposed to the solution comprising an ion for at least about 1 hour, at least about 3 hours, at least about 6 hours, at least about 12 hours, at least about 1 day, at least about 2 days, at least about 3 days, at least about 4 days, or at least about 5 days. In some embodiments, the polymer is exposed to the solution comprising an ion for an amount of time in the range of about 1 hour to about 3 hours, about 1 hour to about 6 hours, about 1 hour to about 12 hours, about 1 hour to about 1 day, or about 1 hour to about 5 days.

In some embodiments, the polymer layer is exposed to the solution comprising an ion at a temperature of at least about 25° C., at least about 50° C., at least about 75° C., at least about 100° C., or at least about 200° C. In some embodiments, the temperature may be in the range of about 25° C. to about 100° C., about 25° C. to about 200° C., about 50° C. to about 100° C., about 50° C. to about 200° C., about 75° C. to about 100° C., about 75° C. to about 200° C., or about 100° C. to about 200° C. In some cases, the temperature is lower than the glass transition temperature of the polymer layer.

In some embodiments, the method further comprises using the solution to form a film. In certain embodiments, the film is formed by physical deposition or chemical deposition. In some embodiments, the film is formed by drop casting, spin coating/casting, centrifugal casting, dip coating, sol-gel, physical vapor deposition, chemical vapor deposition, or atomic layer deposition. In some embodiments, the film is formed by drop-casting. In some embodiments, the film is case via spin-casting.

In some embodiments, the method further comprises annealing the film. In certain embodiments, the film is annealed at about 25-80° C., about 30-60° C., or about 30-50° C. In some embodiments, the film is annealed at about 40° C. In some embodiments, the film is annealed for about 24 hours, 18 hours, 12 hours, 6 hours, or 1 hour. In certain embodiments, the film is annealed at 40° C. overnight.

In certain embodiments, the method further comprises pressing the film. In certain embodiments, the film is pressed at about 25-100° C., about 40-90° C., or about 60-80° C. In certain embodiments, the film is pressed at about 60-80° C. In some embodiments, the film is pressed at about 70° C. In some embodiments, the film is pressed for about 600-300 seconds, about 120-60 seconds, about 60-10 seconds. In some embodiments, the film is pressed for about 600 seconds, about 300 seconds, about 120 seconds, about 60 seconds, about 50 seconds, about 40 seconds, about 30 seconds, about 20 seconds, or about 10 seconds. In some embodiments, the film is pressed for about 10-60 seconds. In some embodiments, the film is pressed for about 30 seconds. In certain embodiments, the film is pressed at about 0.25, about 0.50, about 0.75, or about 1 Ton. In certain embodiments, the film is pressed at about 0.50 Ton. In certain embodiments, the film is pressed at 0.5 Ton at about 60-80° C. for 10-60 seconds.

In some embodiments, the method further comprises annealing the film by drying the film at a temperature above 25° C. In certain embodiments, the film is annealed at about 25-120° C., about 40-100° C., or about 60-80° C. In some embodiments, the film is annealed at about 60-80° C. In some embodiments, the film is annealed for about 24 hours, 18 hours, 12 hours, 6 hours, or 1 hour. In certain embodiments, the film is anneal at about 60-80° C. overnight.

In some embodiments, the method further comprises annealing the film by vacuum drying the film at a temperature above 25° C. In certain embodiments, the film is annealed at about 25-120° C., about 40-100° C., or about 60-80° C. in a vacuum oven. In some embodiments, the film is annealed at about 60-80° C. in a vacuum oven. In some embodiments, the film is annealed for about 24 hours, 18 hours, 12 hours, 6 hours, or 1 hour in a vacuum oven. In certain embodiments, the film is anneal at about 60-80° C. overnight in a vacuum oven.

In some aspects, a solid-state electrolyte as described herein is by a process comprising the steps of: (i) hydroborating polybutadiene with a borane or organoborane to yield a borylated-polybutadiene, (ii) doping the borylated-polybutadiene with an ion, and (iii) forming a film. In some aspects, a solid-state electrolyte as described herein is by a process comprising the steps of: (i) hydroborating polybutadiene with a borane or organoborane to yield a borylated-polybutadiene and (ii) forming a film in the presence of an ion. In some aspects, the film is formed by melt casting. In some aspects, the film is formed by melt pressing.

In certain embodiments, the disclosure provides a solid-state electrolyte as disclosed herein made by a process comprising the steps of: hydroborating polybutadiene with a borane or organoborane to yield a borylated-polybutadiene, mixing the borylated-polybutadiene and a ion in a solvent and forming the film. In certain embodiments, the disclosure provides a solid-state electrolyte as disclosed herein made by a process comprising the steps of: hydroborating polybutadiene with a borane or organoborane to yield a borylated-polybutadiene, mixing the borylated-polybutadiene and a ion in a solvent, forming the film, annealing the film, pressing the film, and drying the film. In certain embodiments, the disclosure provides a solid-state electrolyte as disclosed herein made by a process comprising the steps of: hydroborating polybutadiene with a borane or organoborane to yield a borylated-polybutadiene, mixing the borylated-polybutadiene and a ion in a solvent, and casting the solution to form a film. In certain embodiments, the disclosure provides a solid-state electrolyte as disclosed herein made by a process comprising the steps of: hydroborating polybutadiene with a borane or organoborane to yield a borylated-polybutadiene, mixing the borylated-polybutadiene and a ion in a solvent, casting the solution to form a film, annealing the film, pressing the film, and drying the film. Each of these steps may be carried as described above.

Kits

In further aspects, the disclosure provides a kit comprising polybutadiene, a hydroboration reagent, optionally a solvent, and optionally a catalyst. In some embodiments, the contents of the kit are used to hydroborate polybutadiene comprising any of the methods as described herein. For instance, the kit can be used to hydroborate polybutadiene by contacting the polybutadiene and hydroboration reagent. The kit can be used to hydroborate polybutadiene by placing the polybutadiene and hydroboration reagent in solvent. Optionally, a catalyst can be included in the kit to facilitate the reaction. In certain embodiments, the hydroboration reagent is as described herein.

In further aspects, the disclosure provides a kit comprising butadiene monomers, a metal-based catalyst for polybutadiene polymerization, a hydroboration reagent, optionally a solvent, and optionally a catalyst. In some embodiments, the contents of the kit are used to polymerize butadiene monomers to form polybutadiene in accordance with any method known in the art. For instance, the kit can be used to polymerize butadiene by contract butadiene with the metal-based catalyst for polybutadiene polymerization. The kit can be used to polymerize butadiene by placing the butadiene monomers and metal-based catalyst in solvent. In some embodiments, the contents of the kit are used to hydroborate polybutadiene comprising any of the methods as described herein. For instance, the kit can be used to hydroborate polybutadiene by contacting the polybutadiene and hydroboration reagent. The kit can be used to hydroborate polybutadiene by placing the polybutadiene and hydroboration reagent in solvent. Optionally, a catalyst can be included in the kit to facilitate the reaction. In certain embodiments, the hydroboration reagent is as described herein.

In certain embodiments, the kit further comprises a salt. In some embodiments, the salt comprises $Li^+$, $Na^+$, $K^+$, $Ag^+$, $Mg^{2+}$, $Ca^{2+}$, $Ba^{2+}$, $Zn^{2+}$, or $O^{2+}$. In certain embodiments, the solvent is $Li^+$. In some embodiments, after hydroborating the polybutadiene with the hydroboration reagent as described above, the borylated-polybutadiene and salt are mixed in solvent. After mixing, the polymer film can be formed or cast as described herein.

Methods and Uses of the Solid-State Electrolyte

In certain aspects, the disclosure further provides an electrochemical cell, comprising a solid-state electrolyte as described herein. In an illustrative embodiment, the polymer film solid-state electrolyte may be used in an the electrochemical cell. In some embodiments, the electrochemical cell is a lithium-ion electrochemical cell. The first electroactive structure of the electrochemical cell may be an anode. The first electroactive structure may, for example, comprise carbon (e.g., graphite, petroleum coke, mesocarbon microbeads), silicon, lithium, antimony, tin, tin dioxide ($SnO_2$), titanium dioxide ($TiO_2$), lithium titanate ($Li_2TiO_3$), or an intermetallic compounds (e.g., Co—Sb). In some embodiments, the first electroactive structure comprises an alloy of silicon, lithium, antimony, and/or tin. The second electroactive structure of the electrochemical cell may be a cathode. The second electroactive structure may, for example, comprise a lithium intercalation compound (e.g., lithium cobalt oxide, lithium iron phosphate, lithium nickel oxide, lithium manganese oxide, lithium nickel cobalt manganese oxide).

In certain embodiments, the disclosure provides a method of transporting ions comprising contacting the solid-state electrolyte as described herein with ions. The contacting of the solid-state electrolyte and ions may occur in an electrochemical cell. The transporting of ions may generate power.

In some aspects, the disclosure provides for the use of a solid-state electrolyte as described herein to transport ions. The transport of ions may occur in an electrochemical cell. The transporting of ions may generate power.

Further, the disclosure provides, methods of conducting electrical charge comprising contacting a solid-state electrolyte as described with ions. The contacting of the solid-state electrolyte and ions may occur in an electrochemical cell. The conducting of electrical charge may generate power.

In certain embodiments, the disclosure provides uses of a solid-state electrolyte as described herein to conduct electrical charge. The conducting of electrical charge may generate power. In some embodiments, the disclosure provides uses of a solid-state electrolyte as described herein to conduct electricity.

EXAMPLES

In order that the present disclosure may be more fully understood, the following examples are set forth. The synthetic and biological examples described in this application are offered to illustrate the compounds, pharmaceutical compositions, methods, and uses provided herein and are not to be construed in any way as limiting their scope.

General

All reagents and solvents were purchased from Aldrich or VWR and used as supplied unless otherwise noted. Lithium bis(fluorosulfonyl)amide (LiFSA, >99%) salt purchased from Oakwood Chemical was used as received. $^1$H nuclear magnetic resonance ($^1$H-NMR) and $^{13}$C nuclear magnetic resonance ($^{13}$C-NMR) spectra were recorded on JEOL JNM-ECZ500R spectrometer operating at 500 and 126 MHz for $^1$H and $^{13}$C NMR, respectively, where the chemical shifts were determined with respect to $CHCl_3$ (δ 7.26), and $CH_2Cl_2$ (δ 5.32) for $^1$H NMR spectroscopy and $CDCl_3$ (δ 77.0 ppm), and $CD_2Cl_2$ (δ 53.84) for $^{13}$C NMR spectroscopy as internal standards, and splitting patterns are designated as s (singlet), d (doublet), t (triplet), and m (multiplet). Coupling constants J are reported in Hertz (Hz). Delta NMR software was used to analyze the NMR spectra. GPC analysis was performed on a Tosoh EcoSEC HLC-8320 with dual TSKgel SuperH3000 columns and a chloroform mobile phase.

Ionic conductivity was measured using the complex impedance method, using two stainless-steel plates as blocking electrode, in the frequency range from 1 MHz to 500 mHz with 100 mV sinusoidal amplitude by using a VMP3 (Bio-Logic) potentiostat. Fluid electrolytes were directly transferred to a stainless-steel plate with a Teflon spacer (I.D.=3.6 mmφ, thickness=1.6 mm). Nonfluid electrolytes were first pelletized with a hydraulic press and dies (6 mmφ), and then free-standing pelletized samples were sandwiched with two stainless-steel plates (thickness of the pelletized samples were measured after conductivity measurement). The cell was thermally equilibrated at each temperature for 1 h using a thermostat chamber (SU-241, Espec) before conductivity was measured.

Example 1: Synthesis

Synthesis of $I_{100}$

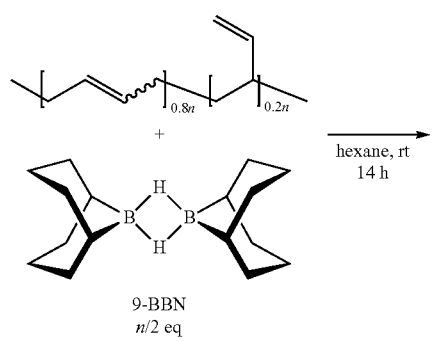

A 40 mL vial was charged with polybutadiene (919 mg), 9-BBN dimer (2.07 g, 8.50 mmol), and hexane (15 mL) was added to the vial. The solution was continuously stirred for 24 h. The reaction mixture was filtered, and the filtrate was concentrated under reduced pressure. The obtained white powder was washed $Et_2O$ (0.5 mL×3) to afford the desired compound (2.54 g, 85% yield).

$^1$H NMR (500 MHz, $CD_2Cl_2$): δ 1.99 (d, J=9.9 Hz, 1H), 1.53 (br d, J=9.9 Hz, 1H), 1.93 (m, 2H), 2.50 (t, J=7.2 Hz, 2H), 2.70 (s, 2H), 3.28 (s, 2H), 3.55 (t, J=6.9 Hz, 2H), 6.29 (s, 2H). $^{13}$C NMR (125 MHz, $CD_2Cl_2$): δ 20.1, 23.5, 23.6, 30.8, 33.5, 33.8, 34.0. $^{11}$B NMR (solid state): δ 79.

Synthesis of $I_{75}$

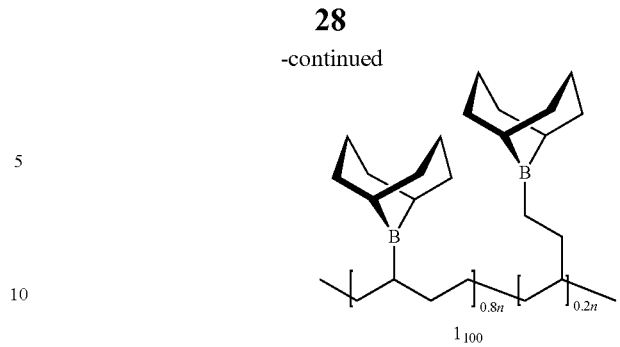

Compound $I_{75}$ was prepared in a similar manner as $I_{100}$. A white powder was obtained in 90% yield.

$^1$H NMR (500 MHz, $CD_2Cl_2$): δ 1.99 (d, J=9.9 Hz, 1H), 1.53 (br d, J=9.9 Hz, 1H), 1.93 (m, 2H), 2.50 (t, J=7.2 Hz, 2H), 2.70 (s, 2H), 3.28 (s, 2H), 3.55 (t, J=6.9 Hz, 2H), 6.29 (s, 2H). $^{13}$C NMR (125 MHz, $CD_2Cl_2$): δ 20.1, 23.5, 23.6, 30.8, 33.5, 33.8, 34.0. $^{11}$B NMR (solid state): δ 81.

Synthesis of $I_{50}$

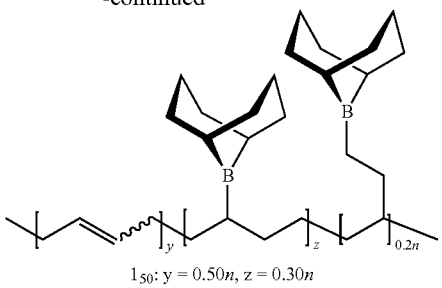

$1_{50}$: y = 0.50n, z = 0.30n

Compound $1_{50}$ was prepared in a similar manner as $1_{100}$. A white powder was obtained in 90% yield.

$^1$H NMR (500 MHz, CD$_2$Cl$_2$): δ 1.99 (d, J=9.9 Hz, 1H), 1.53 (br d, J=9.9 Hz, 1H), 1.93 (m, 2H), 2.50 (t, J=7.2 Hz, 2H), 2.70 (s, 2H), 3.28 (s, 2H), 3.55 (t, J=6.9 Hz, 2H), 6.29 (s, 2H). $^{13}$C NMR (125 MHz, CD$_2$Cl$_2$): δ 20.1, 23.5, 23.6, 30.8, 33.5, 33.8, 34.0. $^{11}$B NMR (160 MHz, CD$_2$Cl$_2$): δ 87.

Synthesis of $1_{25}$

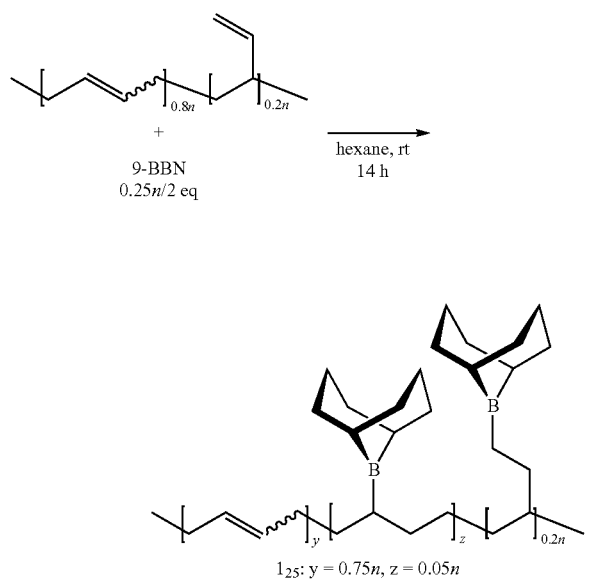

$1_{25}$: y = 0.75n, z = 0.05n

Compound $1_{25}$ was prepared in a similar manner as $1_{100}$. A white powder was obtained in 90% yield.

$^1$H NMR (500 MHz, CD$_2$Cl$_2$): δ 1.99 (d, J=9.9 Hz, 1H), 1.53 (br d, J=9.9 Hz, 1H), 1.93 (m, 2H), 2.50 (t, J=7.2 Hz, 2H), 2.70 (s, 2H), 3.28 (s, 2H), 3.55 (t, J=6.9 Hz, 2H), 6.29 (s, 2H). $^{13}$C NMR (125 MHz, CD$_2$Cl$_2$): δ 20.1, 23.5, 23.6, 30.8, 33.5, 33.8, 34.0. $^{11}$B NMR (160 MHz, CD$_2$Cl$_2$): δ 87.

Synthesis of Films

Borylated polymer is dissolved into 2-methyl-tetrahydrofuran at a concentration of 100 mg/mL. LiTFSI salt is added to achieve the desired ratio of Li:B. Once the salt is fully dissolved, the solution is dropcast onto a substrate for drying. The residual solvent is removed by vacuum drying the films at 60° C. for 24 hours. Films are then utilized directly on the substrate or transferred from the substrate for another application. The entire process takes place in an argon glovebox to prevent exposure to air or moisture.

Regeneration of Polybutadiene

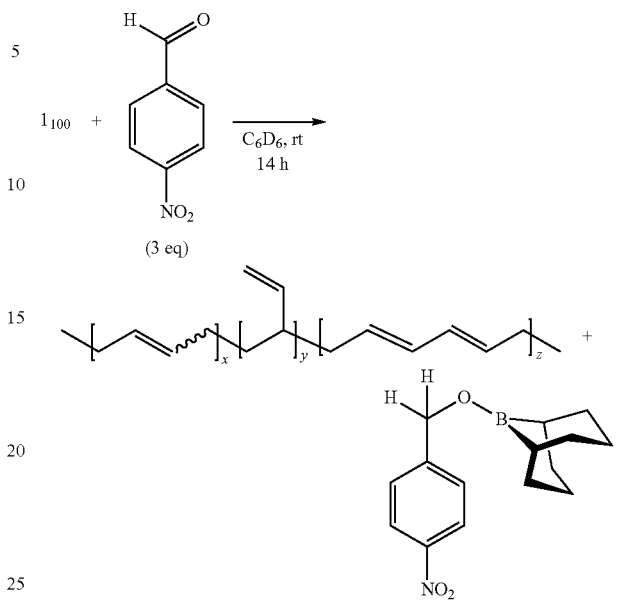

Figure 9:
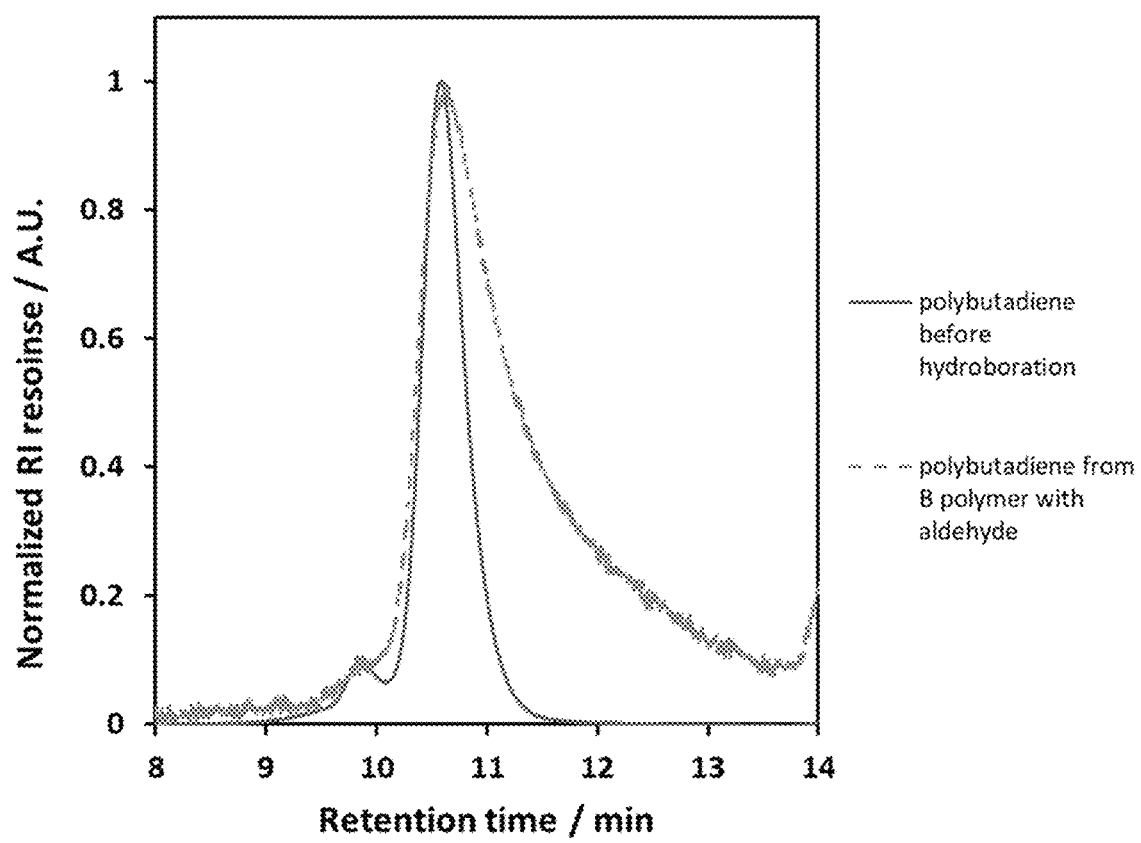
FIG. 9 shows a GPC trace of the reaction of $1_{100}$ with 4-nitrobenzaldehyde and polybutadiene.
Figure 10:
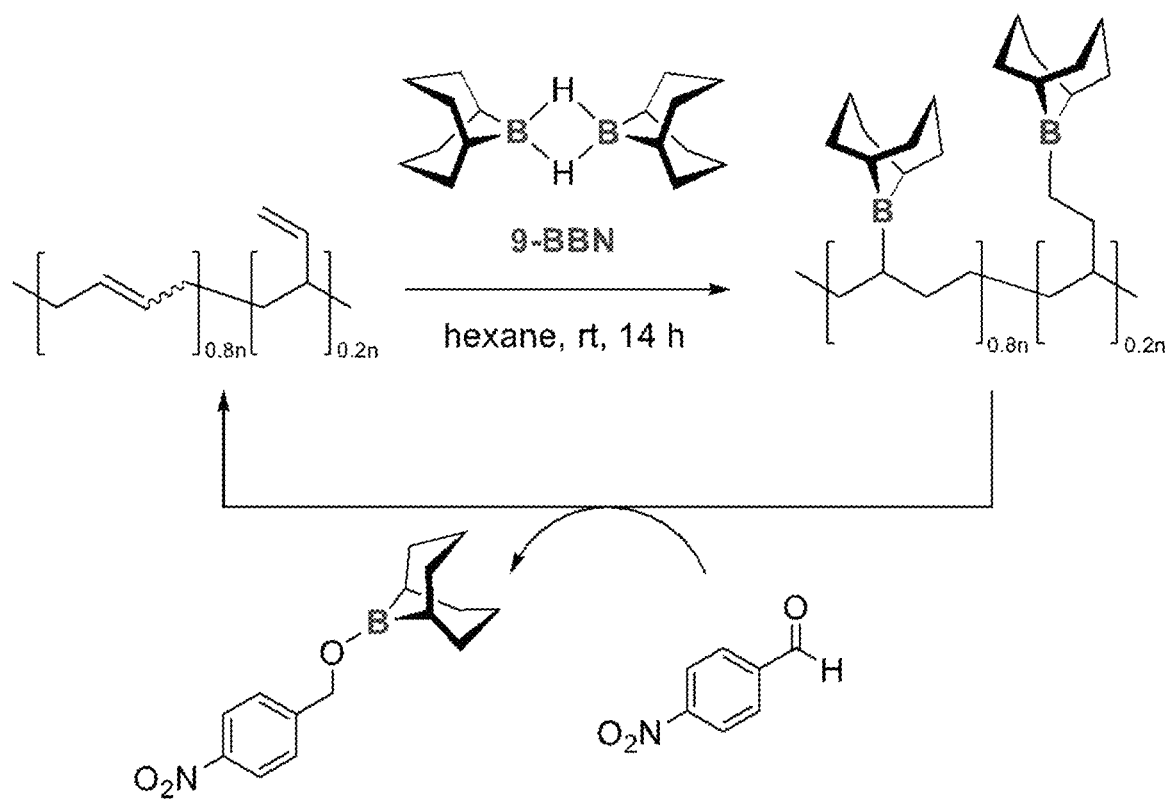
FIG. 10 shows a schematic of the valorization of polybutadiene by a single step hydroboration to a recyclable, Lewis Acid based solid polymeric lithium-ion conductor. Advantages of this system include ability to incorporate high concentration of boron into the polymer, there is no heteroatom potentially coordinating Li cation, the starting material is a commodity polymer, and the resulting polymer is chemically recyclable in mild conditions.
Figure 11:
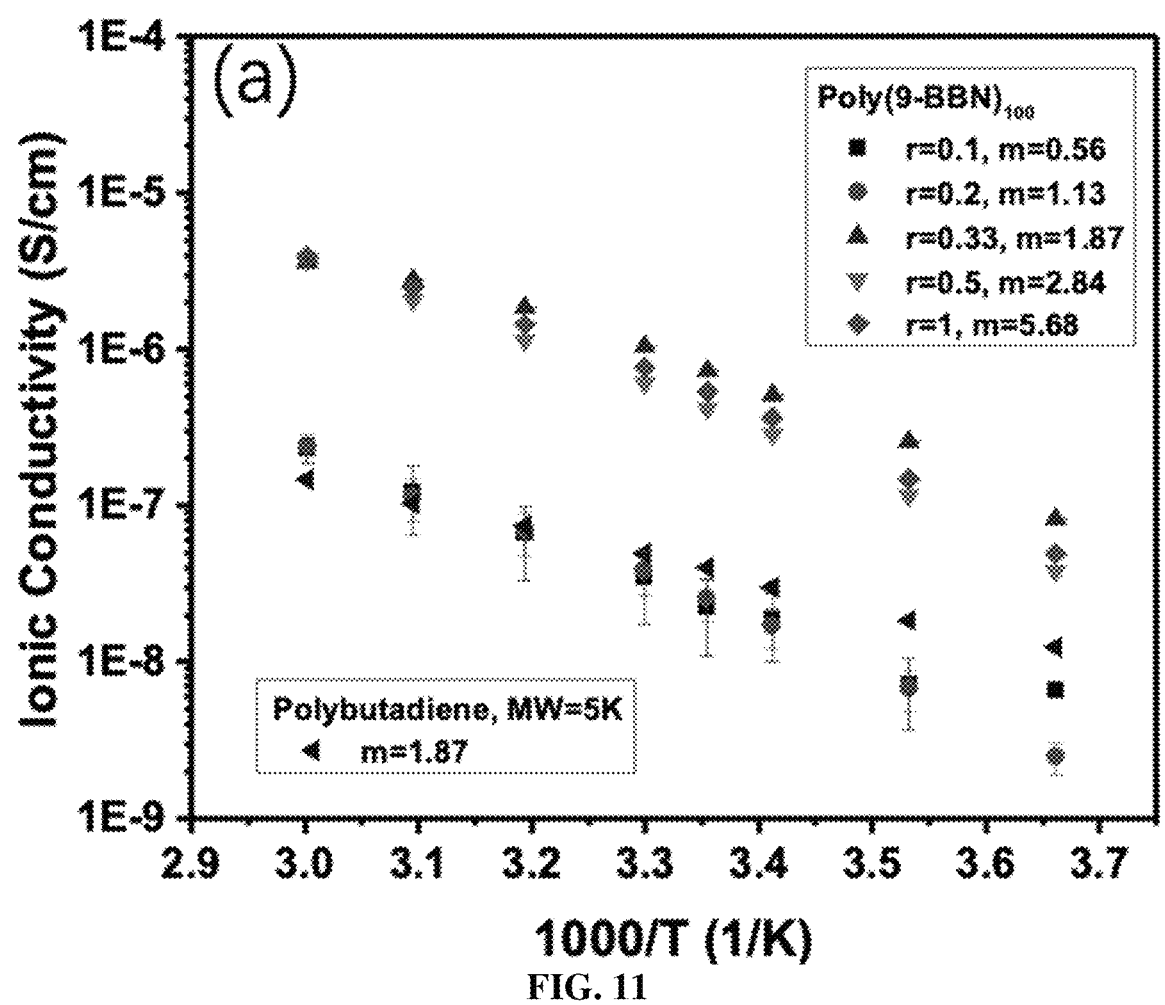
FIG. 11 shows the ionic conductivity in a varying temperature range for $1_{100}$ (also referred to herein as poly(9-BBN)$_{100}$) compared to polybutadiene with varying amounts of LiTFSI (wherein m is salt molality expressed by mole of salt per Kg of polymer, r is the ratio of mol of Li:mol of B) including wherein r=0.1, 0.2, 0.33, 0.50, and 1.00.
Figure 12:
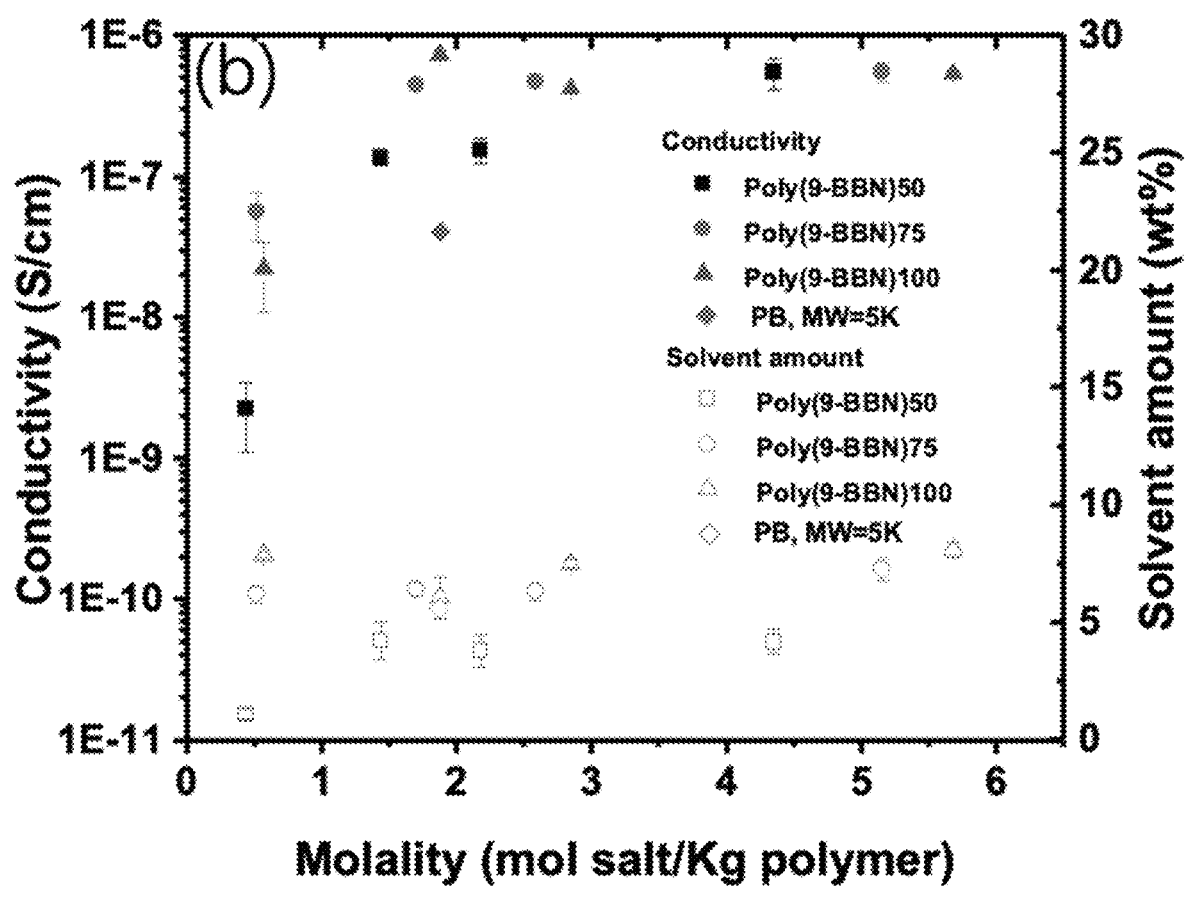
FIG. 12 shows the ionic conductivity of poly(9-BBN)$_x$ where x=100, 75, or 50 (i.e., also referred herein as $1_{100}$, $1_{75}$, and $1_{50}$) and polybutadiene as a function of molality (mol Li salt/mass of polymer), as well as the weight percent of solvent in either poly(9-BBN) ($1_{100}$, $1_{75}$, and $1_{50}$) or polybutadiene as a function of molality (mol Li salt/mass of polymer).

A 10 mL vial was charged with 1100 (10 mg) and 4-nitrobenzaldehyde (23.5 mg, 3 eq relative to unit group of $1_{100}$), and benzene-d6 (0.7 mL) was added to the vial. The solution was monitored by $^1$H NMR measurement. After confirming all boron groups were transferred to the aldehyde, 0.2 mL of the solution was diluted with CHCl$_3$ and filtered. The obtained solution was directly analyzed by GPC. See FIG. 9.

Temperature Dependent Ionic Conductivity

The electrolyte film is prepared by drop casting onto a stainless steel (SS) electrode. Once dry, another stainless steel electrode is added on top of the film creating a SS|electrolyte|SS stack. A wave spring is added and the entire assembly is sealed inside and airtight casing under argon atmosphere. The assembly is placed inside of a temperature controlled chamber and electrochemical impedance spectroscopy (EIS) is performed from 200 mHz to 1 MHz to extract the bulk resistance of the electrolyte film. The thickness of the film is measured after the experiment is complete and used to calculate the ionic conductivity. See for example FIGS. 4 and 5.

Golf Ball Experiments

Figure 13:
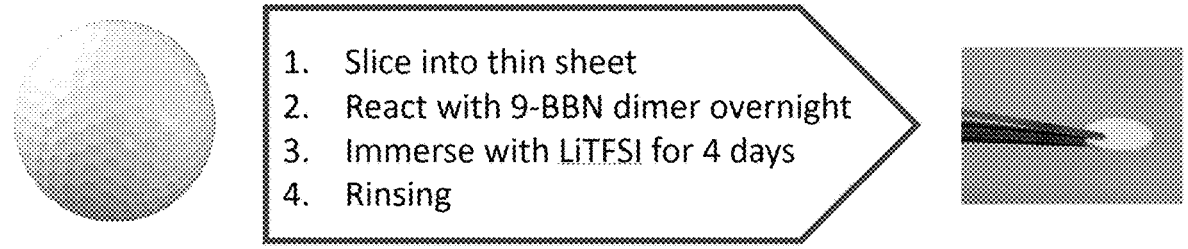
FIG. 13 shows a schematic conversion of polybutadiene in a waste golf ball to lithium conductive materials.
Figure 14:
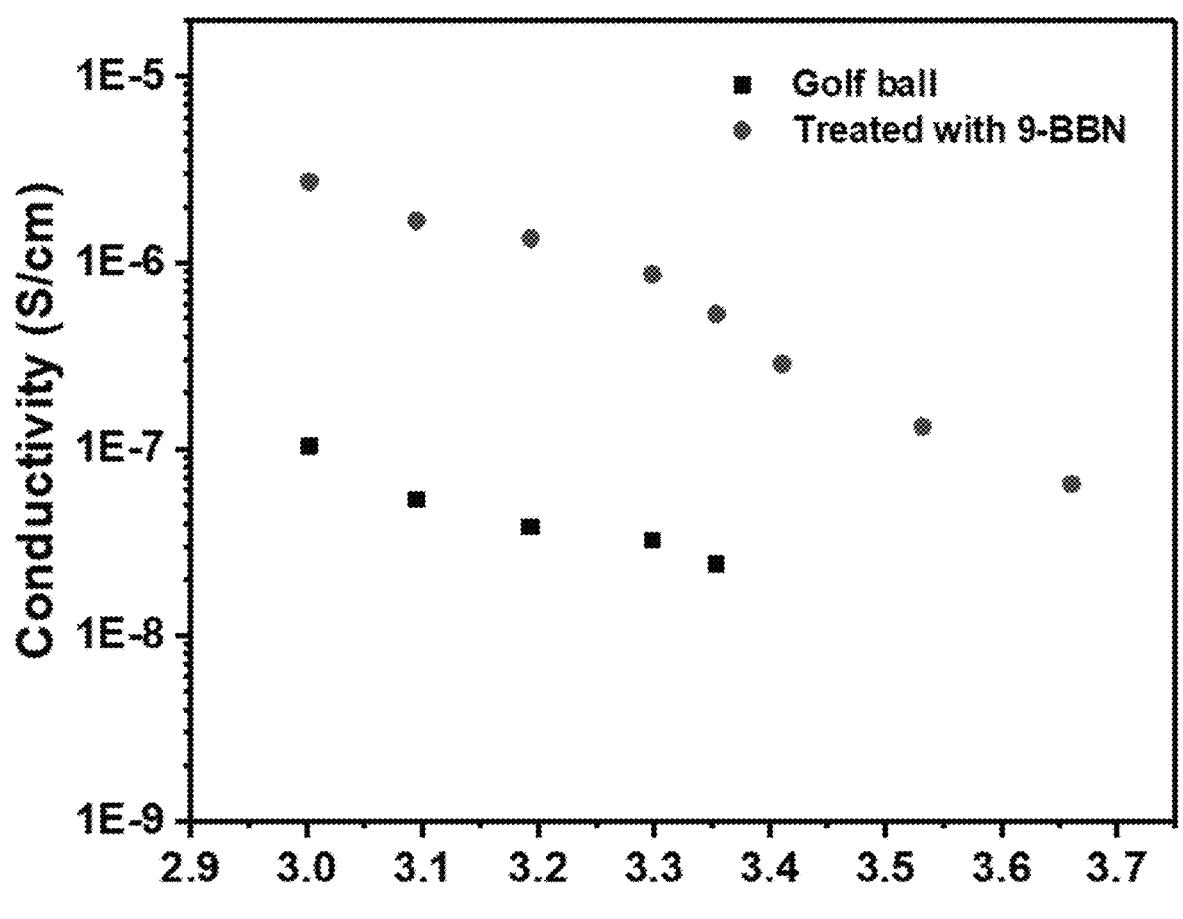
FIG. 14 shows the ionic conductivity in a varying temperature range of either polybutadiene-based sheets derived from a golf ball or polybutadiene-based sheets derived from a golf ball after hydroboration with 9-BBN per the scheme in FIG. 13.

Golf balls are sliced into approximately 100-200 micron films. The slices were immersed in a THF solution containing 1M 9-BBN overnight. The reacted golf slice was rinsed with THF and immersed in a 1M THF/LiTFSI solution for 4 days. The slice was rinsed and dried under vacuum to remove solvent. The ionic conductivity was collected by placing slices between two stainless steel spacers and measured by EIS. See for example FIGS. 13 and 14.

Exemplary Results

The hydroboration of a commercially available polybutadiene ($M_n$: 5000, cis and trans-1,4, 80% and vinyl, 20%, PDI=1.03) using 9-BBN was examined (FIG. 1). The addition of 9-BBN to a solution of polybutadiene in hexane resulted in the white suspension of undissolved 9-BBN, which gradually became soluble to give a colorless solution. The fully borylated polymer $1_{100}$ was isolated as a white solid by simple evaporation of the solvent. The disappearance of the internal and terminal olefin resonances corresponding to 1,4- and 1,2-polybutadiene in the $^1$H NMR spectrum of $1_{100}$, indicated both the internal and terminal olefin could be completely hydroborated. Additionally, a broad resonance at 80 ppm corresponding to tricoordinate boron was found in the solid state $^{11}$B NMR measurement. In similar manner, 25, 50, or 75 mol % of 9-BBN relative to the olefin group on polybutadiene was added to polybutadiene to give $1_{25}$, $1_{50}$, or $1_{75}$ (FIG. 1). $1_{25}$ and $1_{50}$ could be isolated as colorless oil, whereas $1_{75}$ was obtained as a white solid, indicating that the glass transition temperature ($T_g$) of 9-BBN-based copolymers could be different depending on the amount BBN group in the polymer chain. In all $^1$H NMR spectra of $1_{25}$, $1_{50}$, $1_{75}$, and $1_{100}$, the terminal olefinic proton resonances were fully consumed, indicating that the hydroboration of terminal olefins was much faster than that of internal olefins.

Although the obtained borylated polymers could not be analyzed by GPC due to their air sensitivity, polybutadiene regenerated by the reaction of $1_{100}$ with 4-nitrobenzaldehyde[9] was analyzed by GPC and the molecular weight and polydispersity index (PDI) of the polybutadiene was similar with those of the starting material, suggesting that chain scission and/or cross-linking reactions did not proceed during the hydroboration process. This reaction suggested the boron polymer could be chemically recycled under mild conditions.

With this library of boron-based polymers in hand, electrolytes prepared by simply mixing the polymers with lithium bis(trifluoromethanesulfonyl)imide (LiTSFI) were examined. The reaction of 1 with LiTFSI with various ratios of r=0.01, 0.05, 0.33, 0.40, 0.50, 0.60, and 1.00 (r value is the molar ratio of TFSI anion and boron atom on the polymer) in 2-methyl-tetrahydrofuran (m-THF) afforded clear solutions which were drop-casted onto 16 mm diameter stainless-steel plate with a Teflon spacer. Prior to electrochemical analysis, the electrolytes were vacuum-dried for 1 day at 60° C. to remove m-THF. Remaining m-THF was determined to be around 5~10 wt % by $^1$H NMR spectrum. The conductivity data of $1_x$ (x=50, 75 and 100) at 25° C. is summarized in FIG. 5. When the amount of LiTFSI in the polymer increased from r=0.05 to r=0.5, the conductivity increased up to $5.1 \times 10^{-6}$ at 25° C., similar to the conductivity of PEO. However, the addition of LiTFSI more than r=0.5 resulted in a drop-in conductivity, likely due to the cross-linking reaction by TFSI anion. Notably, the less hydroborated polymer such as $1_{75}$ and $1_{50}$ showed lower conductivity compared with $1_{100}$, suggesting that the concentration of Lewis acidic sites could be crucial to obtain high conductivity.

Figure 4:
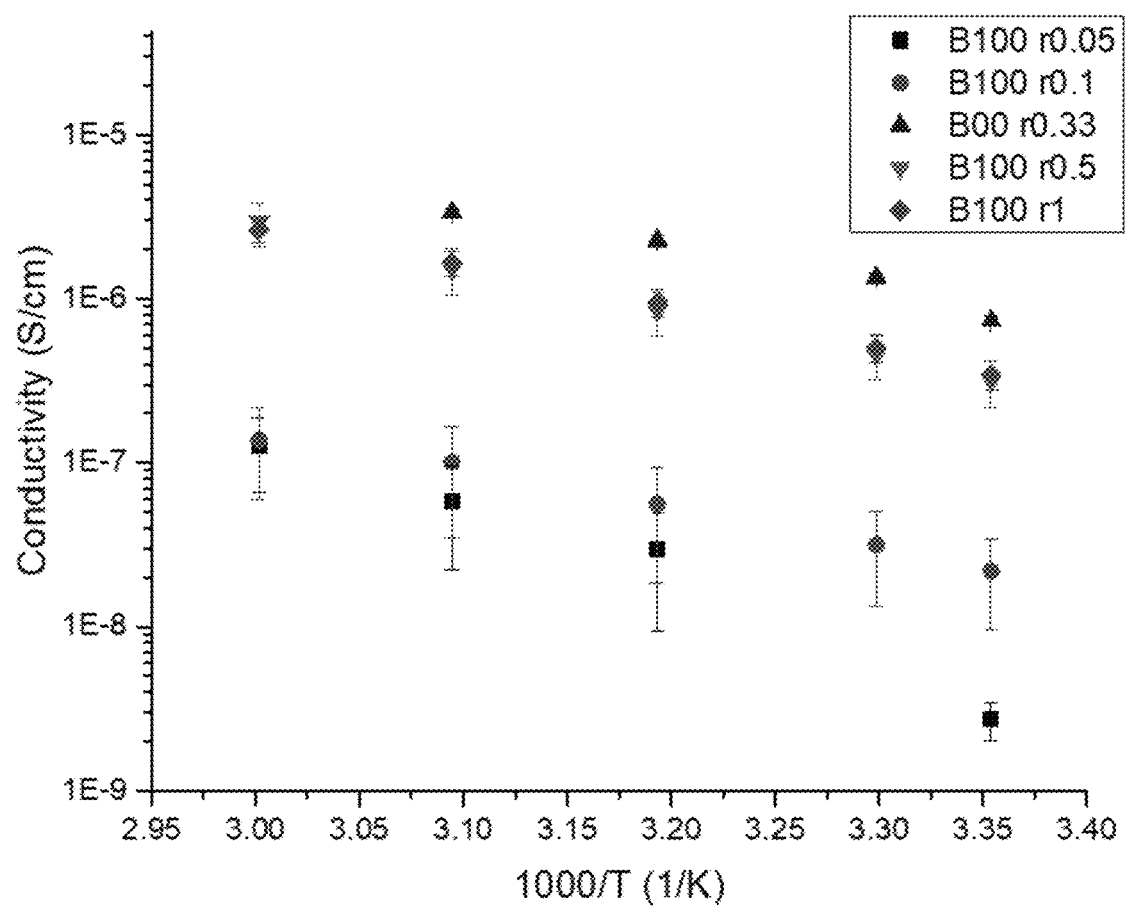
FIG. 4 shows the ionic conductivity in the temperature range of 25 to 60° C. of $1_{100}$ with varying amounts of LiTFSI (wherein r is the ratio of mol of Li:mol of B) including wherein r=0.05, 0.1, 0.33, 0.50, and 1.00.
Figure 5:
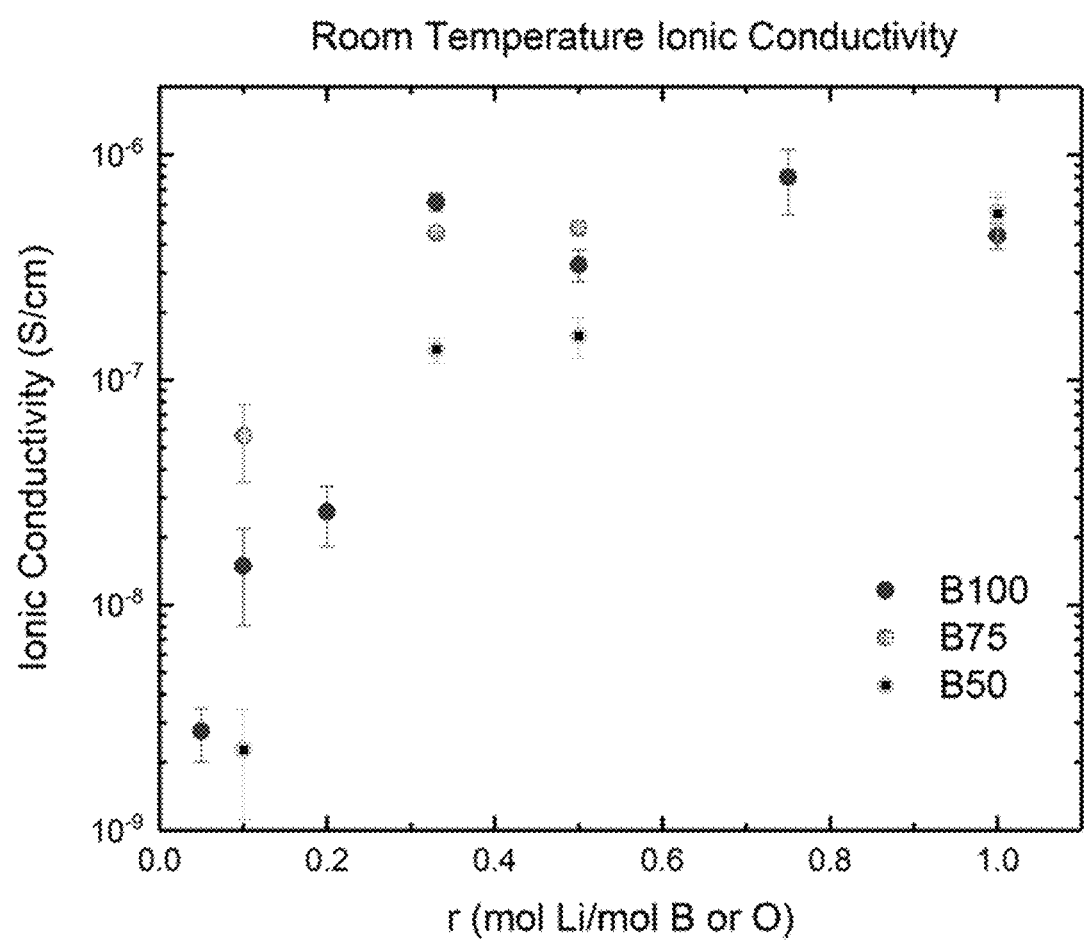
FIG. 5 shows the room temperature ionic conductivity of $1_{100}$, $1_{75}$, and $1_{50}$ at different ratios to Li$^+$.
Figure 6:
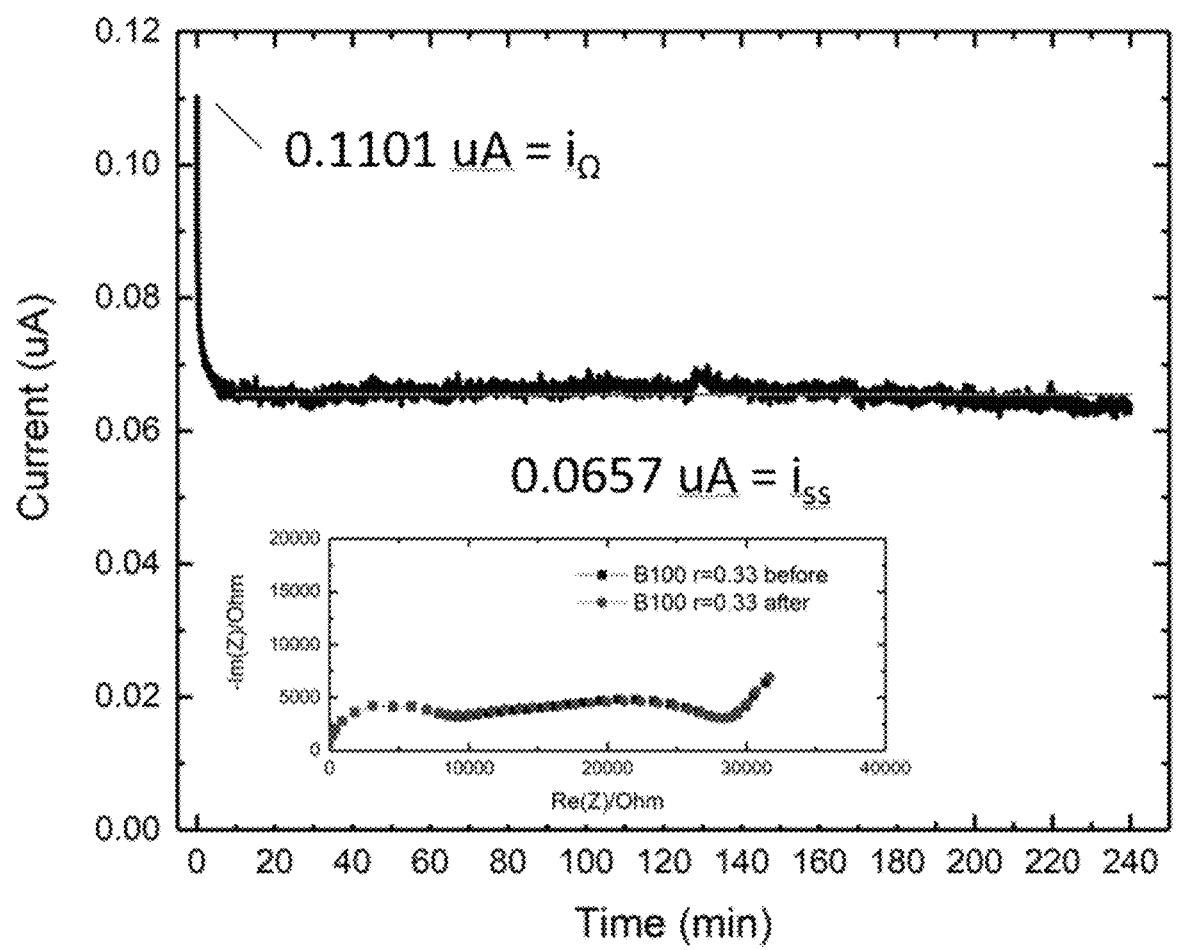
FIG. 6 shows the transference number ($t_{Li+}$=0.53) of $1_{100}$ wherein r=0.33 calculated using the Bruce-Vincent-Evans technique.

The ion conductivity in the temperature range of 25 to 60° C. of $1_{100}$ containing LiTFSI with various ratios of r=0.05, 0.1, 0.33, 0.50, and 1.00 is summarized in FIG. 4. The relationship between conductivity and temperature for polymer-based organic electrolytes usually deviates from linearity at elevated temperatures, which can be closely approximated by the well-known Vogel-Tammann-Fulcher (VTF) equation. However, interestingly, the linear Arrhenius plot was obtained for $1_{100}$ (r=0.5), from which the activation energy was calculated to be 0.24±0.013 eV which is similar with the hopping of Li ions between lattice sites in an inorganic superionic crystal. The low activation energy obtained by the Arrhenius plot may indicate that the conduction mechanism is different from the segmental motion of polymer chain mediating mechanism widely proposed in PEO-based organic electrolyte. The average $t_{Li}^+$ of $1_{100}$ was measured to be 0.53 by using a Bruce-Vincent-Evans (BVE) method (FIG. 6). The equation used to calculate the transference number is:

$$t_{+,SS} = \frac{i_{SS}(\Delta V - i_\Omega R_{i,0})}{i_\Omega(\Delta V - i_{SS} R_{i,SS})}$$

This value (0.53) is nearly three times higher than conventional PEO-based electrolytes.

To understand the effect of anion groups toward the conductivity and $t_{Li}^+$, electrolytes containing $1_{100}$ with various Li salts such as LiOTf, LiBF$_4$, Li difluorobis(oxalate) borate (DFOB), LiClO$_4$, LiNG$_3$ and LiOMe were prepared. Although the conductivity of electrolytes having LiOTf, LiBF$_4$, and LiDFOB showed similar conductivity with that containing LiTFSI ($5.1 \times 10^{-6}$ S cm$^{-1}$), $t_{Li}^+$ were higher than LiTFSI ($t_{Li}^+$=0.66) probably because they were sterically less hindered and possessed stronger basicity than those of LiTFSI.

Figure 7A:
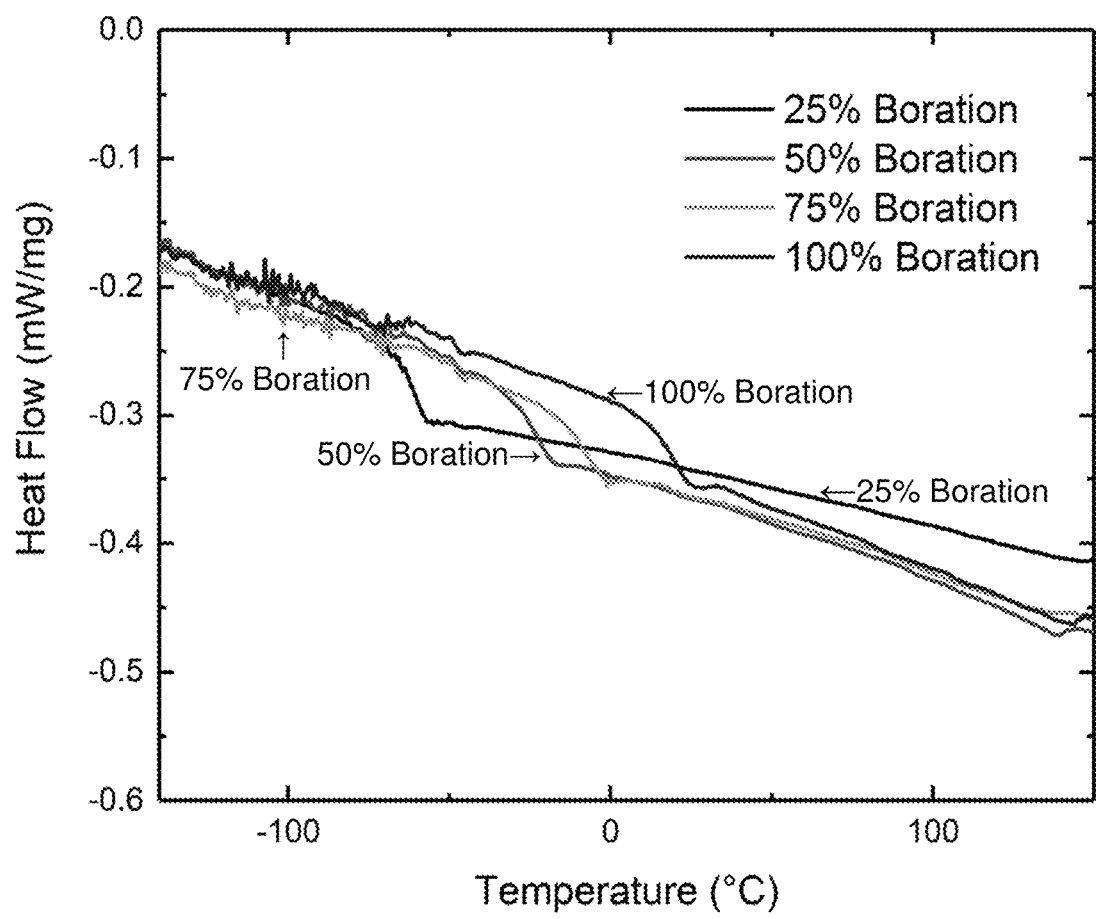
FIG. 7A shows DSC data of $1_x$ (x=25, 50, 75 and 100).
Figure 7B:
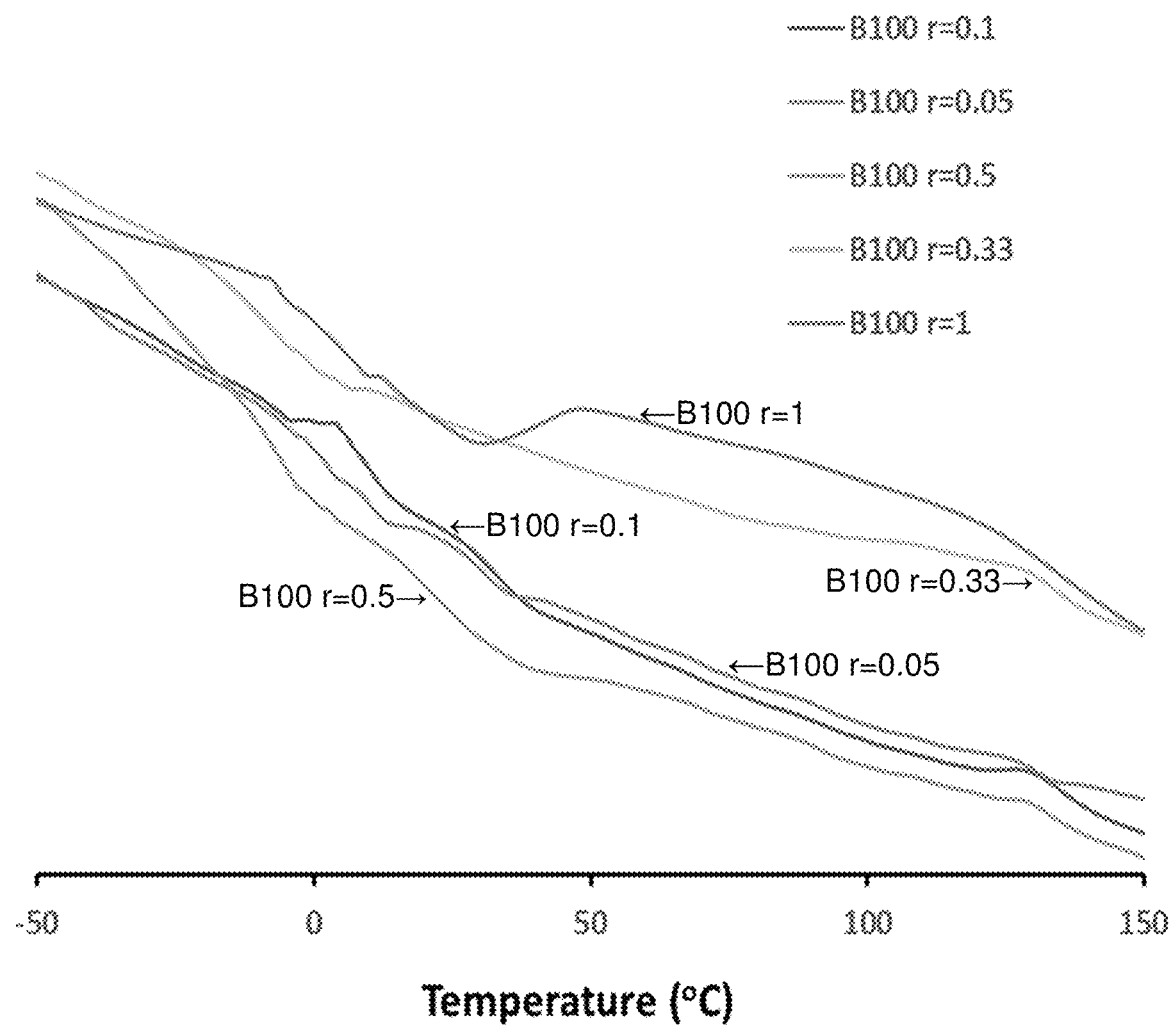
FIG. 7B shows DSC data of electrolytes of $1_{100}$ with varying amounts of LiTFSI.
Figure 8A:
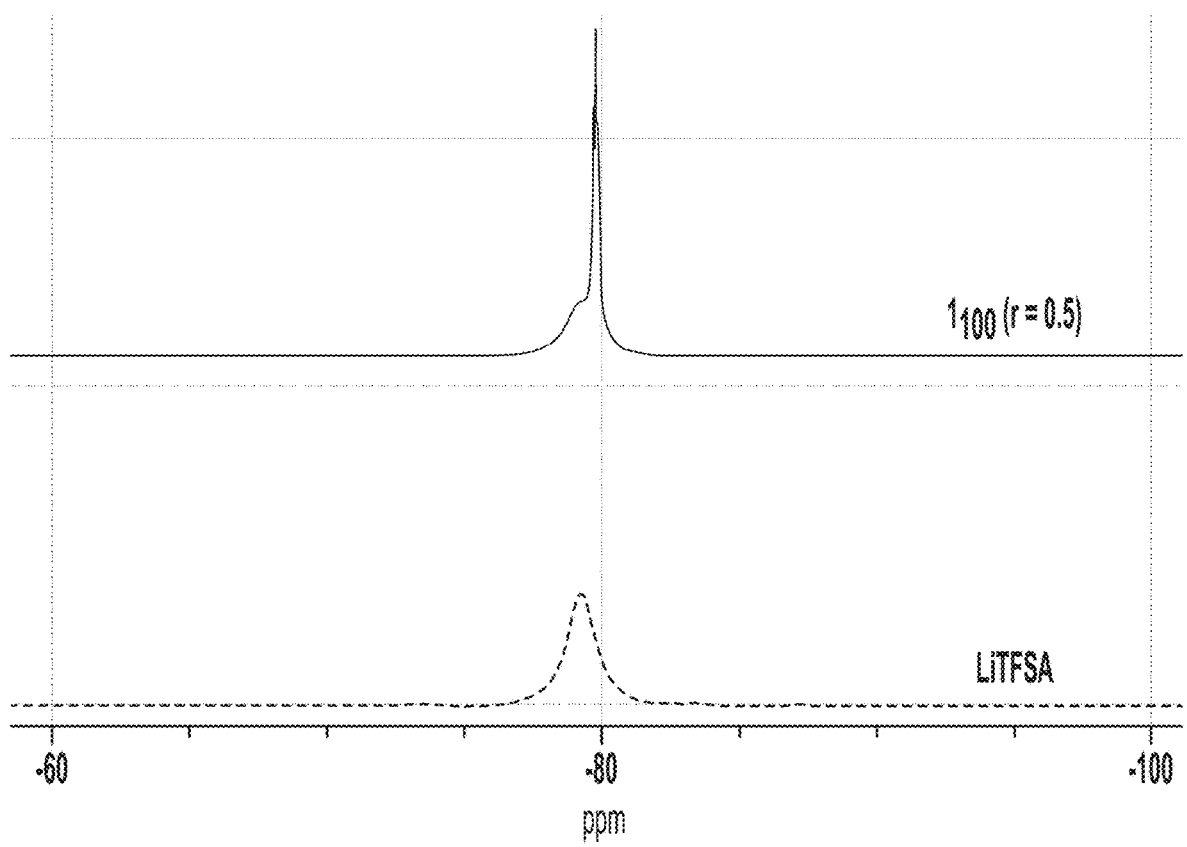
FIG. 8A shows the solid state $^{19}$F NMR spectra of LiTFSI and electrolyte r=0.5.
Figure 8B:
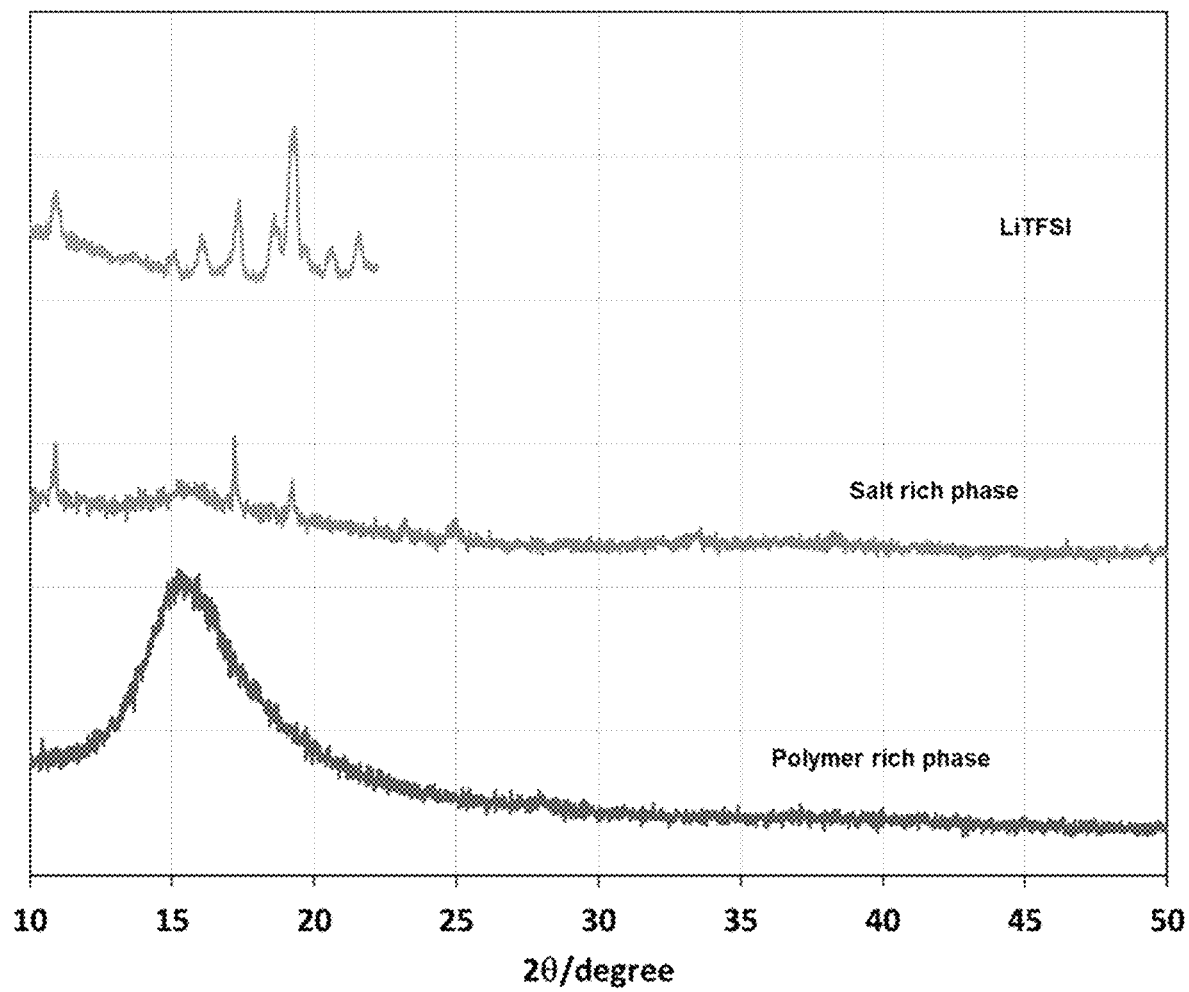
FIG. 8B shows the PXRD pattern of LiTFSI, $1_{100}$, and $1_{100}$ with LiTFSI wherein r=0.5.

To confirm the interaction of $1_{100}$ with lithium salts, the effect of adding anion on the thermal behavior of these electrolytes was investigated by differential scanning calorimeter (DSC) (FIGS. 7A and 7B). The boron polymers $1_x$ (x=25, 50, 75 and 100) showed clear glass transition temperature ($T_g$) below 0° C., whereas the electrolytes containing $1_{100}$ with LiTFSI did not give any obvious $T_g$ peak, probably due to cross-linking of the polymers by anions. Moreover, the obtained electrolyte films were measured by solid state NMR spectroscopy (FIG. 8A). A new sharp resonance was observed along with the broad resonance assignable to CF$_3$ group of LiTFSI in $^{19}$F NMR. Additionally, solid state $^7$Li NMR of the LiTFSI showed broad signal with 118 Hz half line width, whereas $1_{100}$ with LiTFSI showed a narrow line width (30 Hz). These data support the hypothesis that the boron polymer could dissociate the anion group from the Li cation and enhance the mobility of Li cation. Unfortunately, $^{11}$B NMR resonance of $1_{100}$ did not shift after mixing LiTFSI probably due to the weak coordination of TFSI anion to the boron group. The PXRD of polymer $1_{100}$ shows that the polymer electrolyte undergoes phase separation with a salt rich phase and polymer rich phase (FIG. 8B).

In summary, a new boron polymer was developed by simple hydroboration of polybutadiene. The highly concentrated Lewis acidic boron sites along the polymer main chain efficiently trapped anion group of Li salts and the dissociated Li cation was transported with low activation energy. The wide range of anion groups also could be utilized in the boron-based electrolyte. This unique boron-based polymer is a new design of improved polymer electrolytes.

REFERENCES

1. Selected reviews about inorganic based solid state electrolyte (a) Thangadurai, V.; Narayanan, S.; Pinzaru, D. Garnet-Type Solid State Fast Li Ion Conductors for Li Batteries: Critical Review Chem. Soc. Rev., 2014, 43, 4714-4727. (b Bachman, J. C.; Muy, S.; Grimaud, A.; Chang, H.-H.; Pour, N.; Lux, S. F.; Paschos, O.; Maglia, F.; Lupart, S.; Lamp, P.; Giordano, L.; Shao-Horn, Y. Inorganic Solid-State Electrolytes for Lithium Batteries: Mechanisms and Properties Governing Ion Conduction. Chem. Rev. 2016, 116, 140-162.
2. Selected recent example of MOF/COF based solid state electrolyte (a) Hu Y.; Dunlap, N.; Wan, S.; Lu, S.; Huang, S.; Sellinger, I.; Ortiz M.; Jin, Y.; Lee, S; Zhang, W.; Crystalline Lithium Imidazolate Covalent Organic Frameworks with High Li-Ion Conductivity. J. Am. Chem. Soc., 2019, 141, 7518-7525. (b) Jeong, K.; Park, S.; Jung, G. Y.; Kim, S. H.; Lee, Y.; Kwak, S. K.; Lee, S. Solvent-Free, Single Lithium-Ion Conducting Covalent Organic Frameworks. J. Am. Chem. Soc., 2019, 141, 5880-5885. (c) Guo, Z.; Zhang, Y.; Dong, Y.; Li, J; Li, S.; Shao, P.; Feng, X.; Wang B.; Fast Ion Transport Pathway Provided by Polyethylene Glycol Confined in Covalent Organic Frameworks. J. Am. Chem. Soc., 2019, 141, 1923-1927. (d) Chen, H.; Tu, H.; Hu, C.; Liu, Y.; Dong, D.; Sun, Y.; Dai, Y.; Wang, S.; Qian, H.; Lin, Z.; Chen, L. Cationic Covalent Organic Framework Nanosheets for Fast Li-Ion Conduction. J. Am. Chem. Soc. 2018, 140, 896-899. (e) Xu, Q.; Tao, S.; Jiang, Q.; Jiang, D. Ion Conduction in Polyelectrolyte Covalent Organic Frameworks. J. Am. Chem. Soc. 2018, 140, 7429-7432. (f) Montoro, C.; Rodriguez-San-Miguel, D.; Polo, E.; EscuderoCid, R.; Ruiz-Gonzalez, M. L.; Navarro, J. A. R.; Ocon, P.; Zamora, F. Ionic Conductivity and Potential Application for Fuel Cell of a Modified Imine-Based Covalent Organic Framework. J. Am. Chem. Soc. 2017, 139, 10079-10086. (g) Vazquez-Molina, D. A.; MohammadPour, G. S.; Lee, C.; Logan, M. W.; Duan, X.; Harper, J. K.; Uribe-Romo, F. J. Mechanically Shaped Two-Dimensional Covalent Organic Frameworks Reveal Crystallographic Alignment and Fast Li-Ion Conductivity. J. Am. Chem. Soc. 2016, 138, 9767-9770.
3. Selected reviews about polymer based solid state electrolyte (a) Forsyth, M.; Porcarelli, L.; Wang, X.; Goujon, N.; Mecerreyes, D.; Innovative Electrolytes Based on Ionic Liquids and Polymers for Next-Generation Solid-State Batteries. Acc. Chem. Res. 2019, 52, 686-694. (b) Zhang, H.; Li, C.; Piszcz, M.; Coya, E.; Rojo, T.; RodriguezMartinez, L. M.; Armand, M.; Zhou, Z. Single lithium-ion conducting solid polymer electrolytes: advances and perspectives. Chem. Soc. Rev. 2017, 46, 797-815. (c) Xue, Z.; He, D.; Xie, X. Poly(ethylene oxide)-Based Electrolytes for Lithium-Ion Batteries. J. Mater. Chem. A 2015, 3, 19218-19253. (d) Long, L.; Wang, S.; Xiao, M.; Meng, Y. Polymer Electrolytes for Lithium Polymer Batteries. J. Mater. Chem. A 2016, 4, 10038-10069.
4. Xue, Z.; He, D.; Xie, X. Poly(ethylene oxide)-based Electrolytes for Lithium Ion Batteries. J. Mater. Chem. A 2015, 3, 19218-19253.
5. Mehta, M. A.; Fujinami, T.; Inoue, S.; Matushita, K.; Inoue, T. The Use of Boroxine Rings for The Development of High-Performance Polymer Electrolytes. Electrochim. Acta 1999, 45, 1175.
6. Mizumo, T.; Sakamoto, K.; Matsumi, N.; Ohno, H. Simple Introduction of Anion Trapping Site to Polymer Electrolytes through Dehydrocoupling or Hydroboration Reaction Using 9-Borabicyclo[3.3.1]nonan. Electrochim. Acta 2005, 50, 3928-3933.
7. Jing, B. B.; Evans, M. C. Catalyst-Free Dynamic Networks for Recyclable, Self-Healing Solid Polymer Electrolytes. J. Am. Chem. Soc. 2019, ASAP doi/10.1021/jacs.9b09811.
8. Matsumi, N.; Sugai, K.; Miyake, M.; Ohno, H. Polymerized Ionic Liquids via Hydroboration Polymerization as Single Ion Conductive Polymer Electrolytes. Macromolecules 2006, 39, 6924-6927.
9. Midland, M. M.; Zderic, S. A. Kinetics of reductions of substituted benzaldehydes with B-alkyl-9-borabicyclo[3.3.1]nonane (9-BBN). J. Am. Chem. Soc. 1982, 104, 525-528.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A solid-state electrolyte comprising an ion and a polymer, wherein the polymer comprises repeat units comprising alkylene and boronyl moieties.

2. The solid-state electrolyte of claim 1, wherein the polymer further comprises alkenylene moieties.

3. The solid-state electrolyte of claim 1, wherein the polymer is a polybutadiene polymer.

4. The solid-state electrolyte of claim 1, wherein the polymer comprises:
   terminal methyl groups,
   repeat unit Z, which is of the formula:

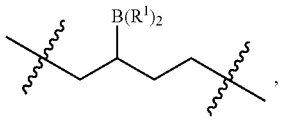

or a salt thereof;
   repeat unit X, which is of the formula:

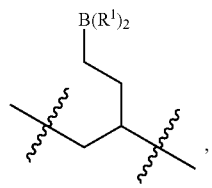

or a salt thereof; and
   repeat unit Y, which is of the formula:

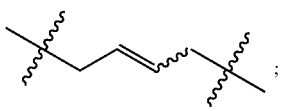

wherein
     each $R^1$ is independently $C_{1-20}$ alkyl, —$OR^2$, hetero$C_{1-20}$ alkyl, $C_{3-10}$ carbocyclyl, or 3-14 membered heterocyclyl, or two $R^1$ groups on the same boron are joined to form a 3-14 membered, monocyclic, bicyclic, or tricyclic, heterocyclyl moiety; and
     each $R^2$ is independently $C_{1-20}$ alkyl, hetero$C_{1-20}$ alkyl, $C_{3-10}$ carbocyclyl, 3-14 membered heterocyclyl, $C_{6-14}$ aryl, or 5-14 membered heteroaryl.

5. The solid-state electrolyte of claim 4, wherein the molar ratio of repeat unit Z to repeat unit X is from about 9:2 to about 1:2.

6. The solid-state electrolyte of claim 4, wherein the molar ratio of repeat unit X to repeat unit Y is from about 9:1 to about 2:9.

7. The solid-state electrolyte of claim 4, wherein the ratio of repeat unit Z to repeat unit X to repeat unit Y is about 11:4:5, about 3:2:5, or about 15:4:1.

8. The solid-state electrolyte of claim 1, wherein the polymer comprises:
   terminal methyl groups,
   repeat unit Z, which is of the formula:

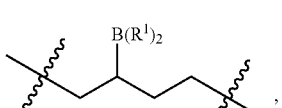

or a salt thereof; and
   repeat unit X, which is of the formula:

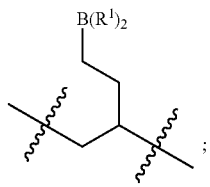

or a salt thereof;
   wherein
     each $R^1$ is independently $C_{1-20}$ alkyl, —$OR^2$, hetero$C_{1-20}$ alkyl, $C_{3-10}$ carbocyclyl, or 3-14 membered heterocyclyl, or two $R^1$ groups on the same boron are joined to form a 3-14 membered, monocyclic, bicyclic, or tricyclic, heterocyclyl moiety; and
     each $R^2$ is independently $C_{1-20}$ alkyl, hetero$C_{1-20}$ alkyl, $C_{3-10}$ carbocyclyl, 3-14 membered heterocyclyl, $C_{6-14}$ aryl, or 5-14 membered heteroaryl.

9. The solid-state electrolyte of claim 8, wherein the molar ratio of repeat unit Z to repeat unit X is about 8:2.

10. The solid-state electrolyte of claim 4, wherein:
    each $R^1$ is $C_{1-20}$ alkyl.

11. The solid-state electrolyte of claim 4, wherein:
    two $R^1$ groups on the same boron are joined to form a 3-14 membered, monocyclic, bicyclic, or tricyclic, heterocyclyl moiety.

12. The solid-state electrolyte of claim 4, wherein —$B(R^1)_2$ is of the formula:

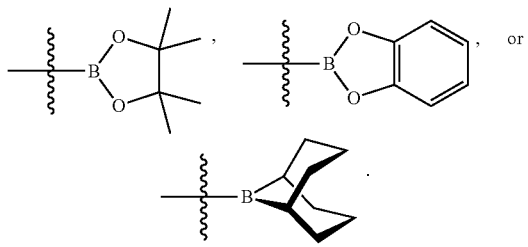

13. The solid-state electrolyte of claim 1, wherein the ion is $Li^+$, $Na^+$, $K^+$, $Ag^+$, $Mg^{2+}$, $Ca^{2+}$, $Ba^{2+}$, $Zn^{2+}$, or $O^{2-}$.

14. The solid-state electrolyte of claim 1, wherein the weight percent percentage of the ion is between about 5% and about 70%.

15. A method of preparing a solid-state electrolyte of claim 1 comprising hydroborating polybutadiene with a borane or organoborane to yield a borylated-polybutadiene.

16. A solid-state electrolyte of claim 1 made by a process comprising the steps of:
    hydroborating polybutadiene with a borane or organoborane to yield a borylated-polybutadiene;
    mixing the borylated-polybutadiene and an ion in a solvent; and
    forming a film.

17. An electrochemical cell comprising the solid-state electrolyte of claim 1.

18. A method of transporting ions comprising contacting the solid-state electrolyte of claim 1 with ions.

19. A method of conducting electrical charge comprising contacting the solid-state electrolyte of claim 1 with ions.

20. The solid-state electrolyte of claim 4, wherein $R^1$ is $C_{1-8}$ alkyl.

21. The solid-state electrolyte of claim 4, wherein R is of the formula:

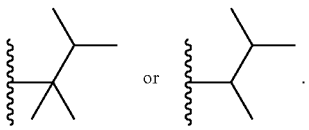

22. The solid-state electrolyte of claim 4, wherein the ion is Li+.

23. The solid-state electrolyte of claim 22, wherein:
(i) the molar ratio of repeat unit X to repeat unit Z to repeat unit Y is 1:4:0, and the molar ratio of Li+ to boron is 0.5;
(ii) the molar ratio of repeat unit X to repeat unit Z to repeat unit Y is 4:11:5, and the molar ratio of Li+ to boron is 0.5;
(iii) the molar ratio of repeat unit X to repeat unit Z to repeat unit Y is 2:3:5, and the molar ratio of Li+ to boron is 0.5; or
(iv) the molar ratio of repeat unit X to repeat unit Z to repeat unit Y is 4:1:15, and the molar ratio of Li+ to boron is 0.5.

24. The solid-state electrolyte of claim 8, wherein two $R^1$ groups on the same boron are joined to form a 3-14 membered, monocyclic, bicyclic, or tricyclic, heterocyclyl moiety.

25. The solid-state electrolyte of claim 8, wherein —B($R^1$)$_2$ is of the formula:

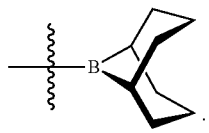

26. The solid-state electrolyte of claim 8, wherein —B($R^1$)$_2$ is of the formula:

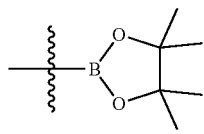 [SMILES: *B1OC(C)(C)C(C)(C)O1]

or

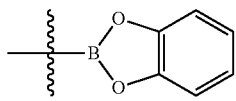

27. The solid-state electrolyte of claim 8, wherein the molar ratio of repeat unit Z to repeat unit X is from about 9:2 to about 1:2.

28. The solid-state electrolyte of claim 8, wherein the ion is Li+.

29. The solid-state electrolyte of claim 8, wherein the weight percentage of the ion is between about 5% and about 70%.

30. The solid-state electrolyte of claim 1, wherein the weight-average molecular weight of the polymer is about 5000 g/mol, about 5100 g/mol, or about 5150 g/mol.

31. The solid-state electrolyte of claim 1, wherein the solid-state electrolyte has a conductivity of $10^{-9}$ to $10^{-4}$ S/cm at 25° C.

* * * * *